US012478626B2

(12) United States Patent
Michielin et al.

(10) Patent No.: US 12,478,626 B2
(45) Date of Patent: Nov. 25, 2025

(54) KINASE MUTANTS AND USES THEREOF

(71) Applicants: SIB Swiss Institute of Bioinformatics, Lausanne (CH); CHUV—Centre Hospitalier Universitaire Vaudois, Lausanne (CH); Universite de Lausanne, Lausanne (CH); Ludwig Institute for Cancer Research Ltd, Zurich (CH)

(72) Inventors: Olivier Michielin, Lausanne (CH); Vincent Zoete, Morges (CH); George Coukos, Chexbres (CH); Melita Irving, Prilly (CH); Nahzli Dilek, Collombey (CH); Patrick Reichenbach, La Sarraz (CH); Kelly Ascencao, Prilly (CH)

(73) Assignees: SIB Swiss Institute of Bioinformatics (CH); CHUV Centre Hospitalier Universitaire Vaudois (CH); Universite de Lausanne (CH); Ludwig Institute for Cancer Research Ltd. (CH)

( * ) Notice: Subject to any disclaimer, the term of this patent is extended or adjusted under 35 U.S.C. 154(b) by 280 days.

(21) Appl. No.: 18/348,175

(22) Filed: Jul. 6, 2023

(65) Prior Publication Data
US 2024/0180965 A1 Jun. 6, 2024

Related U.S. Application Data

(62) Division of application No. 16/615,032, filed as application No. PCT/EP2018/063733 on May 24, 2018, now Pat. No. 11,738,049.

(30) Foreign Application Priority Data

May 24, 2017 (EP) ..................................... 17172639

(51) Int. Cl.
| | |
|---|---|
| C12N 15/10 | (2006.01) |
| A61K 31/517 | (2006.01) |
| A61K 35/17 | (2015.01) |
| C07K 14/55 | (2006.01) |
| C12N 9/12 | (2006.01) |
| C12Q 1/48 | (2006.01) |
| G01N 33/573 | (2006.01) |
| A61K 38/00 | (2006.01) |

(52) U.S. Cl.
CPC ............ A61K 31/517 (2013.01); A61K 35/17 (2013.01); C07K 14/55 (2013.01); C12N 9/1205 (2013.01); C12N 15/1024 (2013.01); C12Q 1/485 (2013.01); G01N 33/573 (2013.01); A61K 38/00 (2013.01); C12Y 207/10 (2013.01)

(58) Field of Classification Search
CPC ........ C12N 15/09; C12N 15/63; C12N 15/64; C12N 15/1024
See application file for complete search history.

(56) References Cited

U.S. PATENT DOCUMENTS

2012/0077827 A1 3/2012 Ibrahim et al.

FOREIGN PATENT DOCUMENTS

WO 00/42042 A2 7/2000

OTHER PUBLICATIONS

Susan E. Levin et al., "Inhibition of ZAP-70 Kinase Activity via an Analog-sensitive Allele Blocks T Cell Receptor and CD28 Superagonist Signaling", Journal of Biological Chemistry, vol. 283, No. 22, May 30, 2008, pp. 15419-15430.
H. Wang et al., "ZAP-70: An Essential Kinase in T-cell Signaling", Cold Spring Harbor Perspectives in Biology, vol. 2, No. 5, May 1, 2010.
Chao Zhang et al., "Structure-Guided Inhibitor Design Expands the Scope of Analog-Sensitive Kinase Technology", ACS Chemical Biology, vol. 8, No. 9, Sep. 20, 2013, pp. 1931-1938.
Bishop A C et al., "A chemical switch for inhibitor-sensitive alleles of any protein kinase", Nature, Macmillan Journals Ltd., ETC, vol. 407, Sep. 21, 2000, pp. 395-401.
B. B. Au-Yeung et al., "A sharp T-cell antigen receptor signaling threshold for T-cell proliferation", Proceedings National Academy of Sciences PNAS, vol. 111, No. 35, Aug. 18, 2014, pp. E3679-E3688.
Byron B Au-Yeung et al., "A genetically selective inhibitor demonstrates a function for the kinase Zap70 in regulatory T cells independent of its catalytic activity", Nature Immunology, vol. 11, No. 12, Oct. 31, 2010, pp. 1085-1092.
Michal Vieth et al., "Kinase Inhibitor Data Modeling and de Novo Inhibitor Design with Fragment Approaches", Journal of Medicinal Chemistry, vol. 52, No. 20, Oct. 22, 2009, pp. 6456-6466.
Chin Y Liew et al., "SVM Model for Virtual Screening of Lck Inhibitors", Journal of Chemical Information and Mode, American Chemical Society, Washington, DC, vol. 49, No. 4, Apr. 27, 2009, pp. 877-888.
K C Lee et al., "Lck is a key target of imatinib and dasatinib in T-cell activation", Leukemia, vol. 24, No. 4, Apr. 1, 2010, pp. 896-900.

(Continued)

*Primary Examiner* — Prema M Mertz
(74) *Attorney, Agent, or Firm* — Fox Rothschild LLP

(57) ABSTRACT

The present invention relates to methods of designing kinase mutants for reprogramming the sensitivity of a target kinase to some specific inhibitors, methods of reprogramming the sensitivity of a target kinase to some specific inhibitors, wherein those kinase inhibitors have little or no affinity for the wild-type target kinase, vectors or cells expressing said mutated kinases, composition and uses thereof for the prevention and/or treatment of a disease or disorder, in particular cancer.

15 Claims, 6 Drawing Sheets

Specification includes a Sequence Listing.

(56) References Cited

OTHER PUBLICATIONS

A. Giannini et al., "Regulation of the Src Family Kinase Lck by Hsp90 and Ubiquitination", Molecular and Cellular Biology, vol. 24, No. 13, Jul. 1, 2004, pp. 5667-5676.
Anthony C. Bishop et al., "Design of allele-specific inhibitors to probe protein kinase signaling", Current Biology, vol. 8, No. 5, Feb. 1, 1998, pp. 257-266.
A. Denzel et al., "Cutting Edge: A Chemical Genetic System for the Analysis of Kinases Regulating T Cell Development", The Journal of Immunology, 2003, 171:519-523.
Mikayama et al., "Molecular cloning and functional expression of a cDNA encoding glycosylation-inhibiting factor", Proc. Natl. Acad. Sci. USA, Nov. 1993, vol. 90, pp. 10056-10060.
Voet et al., "Biochemistry", John Wiley & Sons, Inc., (1990), pp. 126-128 and 228-234.

KINASE MUTANTS AND USES THEREOF

REFERENCE TO A SEQUENCE LISTING

This application contains a Sequence Listing, which has been submitted electronically in xml format and is hereby incorporated by reference in its entirety. Said xml copy, created on Jul. 6, 2023, is named SeqList_084276-00369.xml and is 41,600 bytes in size.

FIELD OF THE INVENTION

The present invention relates to the field of gene therapy and in particular, to the use of genetically modified cells expressing specific kinase mutants for modulating the behavior of those cells with respect to their target, in particular to control the behavior of the cells either involved directly in a target disease or in the control or destruction of the disease-related cells.

BACKGROUND OF THE INVENTION

Protein kinases catalyze the phosphorylation of proteins that in turn modulate the activity of the protein, control its localization in cells, stabilize it or mark it for destruction, and orchestrate its interaction with other proteins. Kinases are thus the key regulators of biological pathways and cell function, particularly in signal transduction and coordination of complex functions such as the cell cycle.

More than 500 human protein kinases have been discovered. In particular, those human protein kinases include lymphocyte-specific protein tyrosine kinase (Lck) found in lymphocytes, notably in T cells and Zeta-chain-associated protein kinase 70 (ZAP-70) found in T cells and natural killer cells (NK cells). Upon the T-cell receptor (TCR) binding to a specific antigen presented by the Major Histocompatibility Complex (MHC), Lck phosphorylates the immunoreceptor tyrosine-based activation motifs (ITAMs) of the intracellular chains of the cluster of differentiation 3 (CD3) and ζ-chains of the TCR complex, allowing cytoplasmic kinase ZAP-70 to bind to them. Lck then phosphorylates and activates ZAP-70. Upon activation of the TCR and phosphorylation of the ITAMs of the TCR complex, ZAP-70 is recruited and phosphorylates the transmembrane protein Linker for activation of T cells (LAT). This initiates a biological cascade leading to the transcription of several gene products allowing T-cells differentiation, proliferation and secretion of cytokines. Therefore, Lck and ZAP-70 play a critical role in T-cell response, and their inhibition leads to T-cell inactivation (Brownlie et al., 2013, *Nature Reviews. Immunology*, 13(4): 257-269; Wang et al., 2010, *Cold Spring Harbor Perspectives in Biology*, 2(5): a002279; Chakraborty et al., 2014, *Nature Immunology*, 15(9), 798-807).

Further protein kinases involved in the control of T-cells function, in particular activation, include proto-oncogene tyrosine-protein kinase Fyn (FYN), tyrosine-protein kinase CSK (or C-terminal Src kinase; CSK), tyrosine-protein kinase ITK/TSK (or interleukin-2-inducible T-cell kinase; ITK) (Brownlie et al., 2013, *Nat Rev Immunol.*, 13, 257-269), tyrosine-protein kinase ABL (ABL) (Gu et al., 2009, *Immunol. Rev.*, 228(1), 170-183).

Due to the kinase importance as targets for the treatment of several pathologies, in particular in oncology, several tens of drugs which inhibit the activity of kinases have been developed or are under development. Studies have shown that, despite the functional and structural similarities between kinases, several kinase inhibitors have a narrow spectrum of specificity, meaning that most of the 500 human kinases will not be affected by them. (Karaman et al., 2008, *Nat. Biotechnol*, 26, 127-132). In particular, several Food and Drug Administration (FDA) approved kinase inhibitors have no or little inhibitory effect on the wild type Zap-70 (e.g. afatinib, erlotinib and lapatinib) or Lck (e.g. afatinib, erlotinib and gefitinib) (Karaman et al., supra).

A method for the generation of target-specific protein kinase inhibitors was developed that utilizes a functionally silent active-site mutation to sensitize a target kinase to inhibition by adenosine triphosphate (ATP) analogs that do not inhibit wild-type kinase (WO 2005/000197). In this approach, a residue at a structurally conserved position in the kinase active site (gatekeeper) is mutated from natural bulky amino acid side chains to smaller residues and a novel pocket is created within the ATP-binding site, which is not found in wild-type kinase. Such an engineered kinase is said to be able to still accommodate ATP and functions normally, but additionally to have a high affinity for large ATP analogs, pyrazolo[3,4-d]pyrimidine (PP) inhibitors, that compete for entry into the ATP binding site. Electrophile-sensitive (ES)-kinases where the gatekeeper site is mutated to cysteine for sensitizing the ES-kinase to PP-inhibitors have been also developed (Zhang et al., 2013, *ACS Chem Biol*, 8(9):1931-8). Mutated kinases were used to study the function of Zap-70 and a first mutant of ZAP-70 (AS1) was generated by mutating the gatekeeper methionine to alanine (M414A) and the second mutant of ZAP-70 (AS2), was generated by introducing, a secondary mutation, C405V, in conjunction with M414A (Levin et al., 2008, *J Biol Chem.*, 283(22): 15419-15430). A similar approach was used to study the function of Lck where mutated Lcks were generated: Lck-as with the mutation T316G and Lck$^a$-as with the double mutation T316G and Y505F mutation (Denzel et al., 2003, *J Immunol.*, 171(2):519-23). In this approach, a mutation is first introduced into the kinase and then a ligand is designed for inhibiting the mutated kinase. The so-designed ligand would then need to be subjected to extensive further characterization and tests for pharmacokinetics and pharmacodynamics in view of potential therapeutic use. Therefore, the attrition rate of those ligands based on undesirable ADME profile is rather high.

Immunotherapy is gaining increasing importance for the treatment and prevention of various human diseases including cancer. Adoptive cell therapy (ACT) uses T-cells engineered to express a cancer-related TCR for recognizing and targeting cancer cells (Rosenberg et al., 2015, *Science*, 348, 62-68; Khalil et al., 2016, *Nat. Rev. Clin. Oncol.*, 13, 273-290). It is known that this type of treatment can lead to rapid and dramatic side effects after reinjection of the modified T-cells into the patient, due, to for instance, to an auto-immune response that may include cerebral hemorrhage, epileptic seizures, cardiac arrest, multiple organ failure and irreversible neurologic damage (van den Berg et al., 2015, *Mol Ther.*, 23, 1541-1550). Currently, side effects are counter-acted by administration of corticosteroids, which results in the shutdown of the whole immune system. Studies investigating the possibility to use suicide genes to eradicate irreversibly the transferred T cells have also been reported (Sato et al., 2007, *Mol. Ther.*, 15, 962-970; Di Stasi et al., 2011, *N. Engl J. Med.*, 365 (18): 1673-1683). However, this technique is rather costly, it will end the effect of the treatment as well by eradicating irreversibly the engineered T-cells and may also itself have further side effects.

The use of adoptive transfer of virus-specific T cells was also in the prevention and treatment of infections with viruses in patients after hematopoietic stem cell transplant (Gerdemann et al., 2013, *Mol Ther.* 21(11): 2113-21; Papadopoulou et al., 2014, *Sci Transl Med.* 6(242): 242ra83). Single T cell lines from stem cell donors, which have specificity for up to five viruses (cytomegalovirus, adenovirus, Epstein Barr virus, BK virus and human herpesvirus 6) have been generated (Papadopoulou et al., 2014, supra).

Stem-cell therapy is an emerging therapeutic route and a well-established and widely used stem cell treatment is the transplantation of blood stem cells to treat diseases and conditions of the blood and immune system, or to restore the blood system after treatments for specific cancers. Examples of used stem-cell therapy include bone marrow transplant and the therapies with the use of umbilical cord blood. Research is underway to develop further sources for stem cells, and to apply stem-cell treatments for neurodegenerative diseases and conditions such as diabetes, heart disease, and other conditions. However, this type of treatment can lead to various side effects such as toxicity, neoplasm formation and other unwanted biological effects (Herberts et al., 2011, *J Transl Med.,* 9: 29).

Therefore, there is a need to find specific agents able to control the auto-immune response resulting from ACT using engineered T-cells, while preserving the immune system integrity of the patient.

SUMMARY OF THE INVENTION

The present invention is based on the finding that it is possible to modify kinases, such as ZAP-70 and/or Lck, for reprogramming them to render them sensitive to a specific inhibitor which had normally no or little binding affinity for the native kinase, in order to control, through the use of the specific inhibitor, the behavior of cells genetically engineered to express those mutated kinases, while keeping the activity of the wild-type kinases in the non-modified cells, unchanged. The invention is particularly directed to the design of new kinase mutants, such as mutants of ZAP-70 and/or Lck, which are rendered sensitive to a selected specific kinase inhibitor having little and no affinity for the wild-type, the expression of those mutants in cells such as T-cells, in particular T-cells expressing at least one cancer-related TCR and the use thereof in the treatment of cancers, for example by adoptive cell therapy. The present invention is particularly useful for controlling the activity of specific biological pathways in specific cells of a living organism, such as a human patient, through the inhibition of those engineered kinases expressed by these specific cells. This invention could be used in several treatments against various human diseases, notably cancer. A particular advantage of the present invention is that, contrarily to standard therapies, the strategy is not necessarily to target the cells at the origin of the disease, e.g. cancer cells, but to possibly modify the behavior of cells that could be involved in the control or destruction of the disease-related cells. Kinase reprograming could be used for modifying the behavior of those controlling cells, by stimulating them against their target, or reversely, by inhibiting them for instance if their excessive activity is at the origin of a detrimental side effect. According to a particular aspect, a typical application of a kinase reprogramming method according to the invention is the control the activity of engineered T-cells used in adoptive cell therapy against cancer. Further, a particular application of a kinase reprogramming method according to the invention can be in treatment of disorders where T-cell therapy is envisioned, notably for prevention and treatment of infections or stem cell therapy.

For example, it is observed that the mutated Zap-70 kinase of the invention can be inhibited by various small inhibitor molecules and the inhibitory response of those mutated Zap-70 kinases to these inhibitors is increased as compared to wild type Zap-70, therefore offering a promising tool for modifying in vivo activity of cells expressing said mutated kinases.

According to a particular aspect, the invention relates to a method of designing mutated kinases for reprogramming the kinase sensitivity to specific inhibitors.

Another aspect of the invention relates to a method for reprogramming cell kinase sensitivity to specific inhibitors.

Another aspect of the invention relates to mutated kinases of the invention, which are sensitive to specific kinase inhibitors, in particular mutated ZAP-70 and/or Lck kinases of the invention.

Another aspect of the invention relates to an isolated nucleic acid molecule encoding a mutated kinase according to the invention.

Another aspect of the invention relates to an isolated cell expressing at least one kinase mutant of the invention, in particular a T cell (e.g. a T-cell expressing at least one cancer-related receptor).

In another aspect, the invention provides a recombinant vector comprising a nucleic acid molecule encoding a kinase mutant according to the invention.

Another aspect of the invention provides a composition comprising an isolated cell (e.g. T cell, in particular a T-cell expressing at least one cancer-related receptor) expressing at least one kinase mutant of the invention or a recombinant vector according to the invention such as for example a pharmaceutical composition comprising cells of the invention or at least one recombinant vector according to the invention and at least one pharmaceutically acceptable carrier, diluent or excipient thereof.

Another aspect of the invention relates to an isolated cell (e.g. T cell, in particular a T-cell expressing at least one cancer-related receptor) expressing at least one kinase mutant of the invention or a recombinant vector according to the invention for use as a medicament.

Another aspect of the invention provides an ex vivo method (e.g. in culture) of inducing the expression of at least one kinase mutant of the invention in a cell (e.g. a T cell, in particular a T-cell expressing at least one cancer-related receptor) comprising the step of ex vivo transducing said cell with a vector according to the invention.

Another aspect of the invention provides a method of inducing in vivo the expression of at least one kinase mutant of the invention in a target cell a cell (e.g. a T cell, in particular a T-cell expressing at least one cancer-related receptor) in a subject in need thereof, said method comprising the steps of administering a vector encoding at least one kinase mutant according to the invention to said subject under suitable conditions for inducing transduction of the subject's target cell in vivo with said vector.

Another aspect of the invention relates to mutated kinases of the invention which are sensitive to at least one specific kinase inhibitor, isolated cells expressing at least one of those mutated kinases or a recombinant vector comprising a nucleic acid molecule encoding at least one of those mutated kinases, for use in controlling the activity of the cells expressing those and in particular for use in the treatment of a disorder or disease, more particularly, a cancer, in combination with said specific at least one kinase inhibitor.

Another aspect of the invention relates to the use of mutated kinases of the invention which are sensitive to specific kinase inhibitors, of isolated cells expressing at least one of those mutated kinases or of a recombinant vector comprising a nucleic acid molecule encoding at least one of those mutated kinases, for the preparation of a pharmaceutical composition for controlling the activity of the cells expressing those and in particular for the treatment of a disorder or disease, more particularly a cancer.

Another aspect of the invention provides a method of treating a disorder or disease in a subject in need thereof, said method comprising administering an effective amount of mutated kinases of the invention, of isolated cells expressing at least one of those mutated kinases or of a recombinant vector comprising a nucleic acid molecule encoding at least one of those mutated kinases, in a subject in need thereof.

Another aspect of the invention provides a kit comprising at least one mutated kinases of the invention, of isolated cells expressing at least one of those mutated kinases or of a recombinant vector comprising a nucleic acid molecule encoding at least one of those mutated kinases according to the invention.

DETAILED DESCRIPTION

Figure 1:
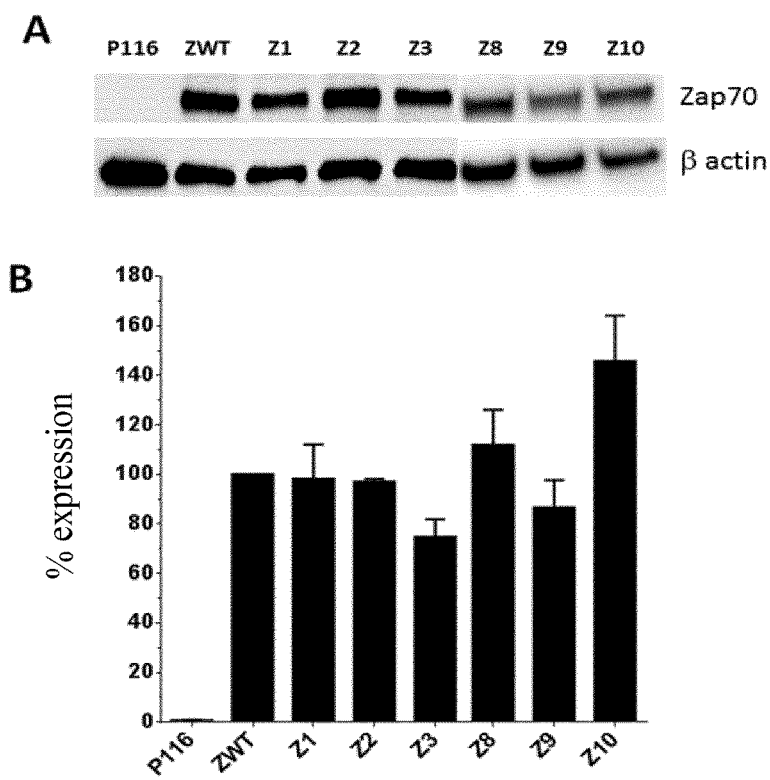
FIG. 1 shows the expression profile of Zap-70 mutants (Z1-Z3 and Z8-Z10) in P116 cells as analysed by western blot (A) and quantified as % of expression (B) as described in Example 3, 100% expression corresponding to the expression of the Zap-70 wild-type (ZWT).

The term "drug candidate" includes any agent which is developmental drug, a drug submitted for approval, an investigational, approved or marketed drug.

The term "approved drug" includes any agent that has been approved for pharmaceutical or veterinary use by a health authority.

The term "cell-based therapies" relates to the therapy that can be used e.g. in cancer immunotherapy and include transfer of various lymphocytes and antigen-presenting cells (APC) into the subject. A type of cell-based therapy is called "adoptive cell therapy" or "ACT" and includes transfer of T lymphocytes. The cells may be autologous, i.e. originating from the subject to be treated and been altered before being transferred back, or, they may have come from another subject (heterologous).

The term "bind" in relation to an inhibitor means an inhibitor which sticks to or has an affinity for an active site of kinase through one or more hydrophobic, hydrophilic, hydrogen, and/or ionic bonds, or, in the case of non-competitive inhibitors, through covalent bonds.

The terms "mutant kinase" or "modified kinase" refers to a kinase of the invention having an amino acid sequence differing from the amino acid at sequence of the wild-type kinase at one or more positions.

The term "cancer-related T-cell receptor" or "cancer-related TCR" refers to a TCR that recognizes at least one cancer-associated antigen. T cells expressing at least one TCR can be used for immunotherapy of cancer through adoptive cell therapy (Rosenberg et al., 2015, supra; Khalilet et al., 2016, supra). Examples of design of T cells expressing at least one TCR are provided under Irving et al., 2012, *Journal of Biological Chemistry*, 287(27), 23068-23078. The term a "chimeric antigen receptor" or "CAR" refers to an engineered receptor, which grafts an arbitrary specificity onto an immune effector cell. Typically, these receptors are used to graft the specificity of a monoclonal antibody onto a T cell with transfer of their coding sequence facilitated by retroviral vectors. The receptors are called chimeric because they are composed of parts from different sources. T cells expressing at least one CAR can be used for immunotherapy of cancer through adoptive cell therapy. Examples of design of T cells expressing at least one CAR are provided under Kalos et al., 2011, *Sci Transl Med*., (95): 95ra73 and U.S. Pat. No. 9,499,629.

The term "stem-cell therapy" refers to the use of stem cells to treat or prevent a disease or condition. Examples of used stem-cell therapy include bone marrow transplant and the therapies with the use of umbilical cord blood. Research is underway to develop further sources for stem cells, and to apply stem-cell treatments for neurodegenerative diseases and conditions such as diabetes, heart disease, and other conditions (Fox et al., 2014, *Science* 345(6199): 1247391; Kimbrel et al., 2015, *Nature Reviews. Drug Discovery*, 14(10), 681-692).

The terms "cancers" or "tumors" as defined herewith are diseases involving abnormal cell growth with the potential to invade or spread to other parts of the body. Term "cancers" designate diseases exemplified by, but not limited to, carcinomas (such as breast, prostate, lung, pancreas, and colon cancers), melanomas, sarcomas (such as bone, cartilage, nerve cancer), lymphomas and leukemias (hematopoietic cancers), germ cell tumors (such as seminoma and dysgerminoma) and blastomas.

As used herein, "treatment" and "treating" and the like generally mean obtaining a desired pharmacological and physiological effect. The effect may be therapeutic in terms of a partial or complete cure of a disease, condition, symptom or adverse effect attributed to the disease or to the used treatment. The term "treatment" as used herein covers any treatment of a cancer in a mammal, particularly a human, and includes inhibiting the disease, i.e., arresting its development; or relieving the disease, i.e., causing regression of the disease and/or its symptoms or conditions such as improvement or remediation of damage. In particular, the cells, vectors, methods, uses, formulations and compositions according to the invention are useful in the treatment of a cancer and/or in the prevention of evolution of a cancer into an advanced or metastatic stage in patients with early stage cancer, thereby improving the cancer staging and patient prognosis. In particular, treatment of a cancer may include administration of cells according to the invention.

The term "efficacy" of a treatment or method according to the invention can be measured based on changes in the course of disease or condition in response to a use or a method according to the invention. For example, the efficacy of a treatment or method according to the invention can be measured by its impact on signs or symptoms of illness. A response is achieved when the subject experiences partial or total alleviation, or reduction of unwanted symptoms of illness. According to a particular embodiment, the efficacy can be measured through the assessing of reduction of side effects (e.g. auto-immune response) observed after reinjection of modified T cells of the invention into a subject in combination with a corresponding specific kinase inhibitor in adoptive cell therapy as compared to standard adoptive cell therapy with modified T cells not expressing the kinase mutants of the invention or with modified T cells expressing kinase mutants but in absence of specific kinase inhibitor.

The term "effective amount" as used herein refers to an amount of at least one cell or recombinant vector according to the invention, or a pharmaceutical formulation thereof, that elicits a detectable reduction of the symptoms of the disease in a subject that is being administered said cells, these symptoms can include, for instance decrease in side effects, increase in duration of treatment or dosage before those side effects appear etc.

The term "subject" as used herein refers to mammals. For examples, mammals contemplated by the present invention include human, primates, domesticated animals such as cattle, sheep, pigs, horses, laboratory rodents, other pets and the like.

Examples of "conservative substitution" include substitution of one aliphatic residue for another, such as Ile, Val, Leu, or Ala for one another, or substitutions of one polar residue for another, such as between Lys and Arg; Glu and Asp; or Gln and Asn. Amino acid hydrophobicity can be found on the basis of known scales such as Kyte, et a4, 1982, *J. Mol Biol*, 157: 105-131; Eisenberg, 1984, *Ann. Rev. Biochem.* 53: 595-623. Other such conservative substitutions, for example, substitutions of entire regions having similar hydrophobicity characteristics or α-helical propensity, are well known (Kyte, et al, 1982, supra). For example, a "conservative amino acid substitution" may involve a substitution of a native amino acid residue with a non-native residue such that there is little or no effect on the polarity or charge of the amino acid residue at that position. Desired amino acid substitutions (whether conservative or non-conservative) can be determined by those skilled in the art at the time such substitutions are desired. Exemplary amino acid substitutions are presented in Table 1 below.

TABLE 1

| Amino acids | Examples of « conservative » substitutions |
| --- | --- |
| Ala (A) | Val, Leu, Ile, Pro |
| Arg (R) | Lys, His |
| Asn (N) | Gln |
| Asp (D) | Glu |
| Cys (C) | Ser, Ala, Thr |
| Gln (Q) | Asn |
| Glu (E) | Asp |
| Gly (G) | Pro, Ala |
| His (H) | Lys, Arg, |
| Ile (I) | Leu, Val, Met, Ala, Phe, Tyr |

TABLE 1-continued

| Amino acids | Examples of « conservative » substitutions |
| --- | --- |
| Leu (L) | Ile, Val, Met, Ala, Phe, Tyr |
| Lys (K) | Arg, His |
| Met (M) | Val, Leu, Ile, Phe |
| Phe (F) | Leu, Val, Ile, Ala, Tyr, Trp |
| Pro (P) | Ala, Gly |
| Ser (S) | Thr, Ala, Cys |
| Trp (W) | Phe, Tyr |
| Thr (T) | Ser |
| Tyr (Y) | Trp, Phe, Thr, Ser |
| Val (V) | Ile, Met, Leu, Phe, Ala, Pro |

Method of Designing Mutated Kinases and Uses Thereof

According to a first aspect, the invention provides a method for designing kinase mutants with reprogrammed sensitivity to specific inhibitors comprising the steps of:
  a) selecting a target kinase involved in a disease-related biological pathway;
  b) selecting an agent, in particular drug candidate (e.g. an inhibitor of a kinase), not being an inhibitor of the target kinase (foreign kinase) having little or no affinity for the wild-type target kinase and having little cross-reactivity with other kinases than the foreign kinase;
  c) mutating the target kinase sequence to render it sensitive to said agent having little or no affinity for the wild-type target kinase, while keeping functional activity of the wild-type target kinase for the mutated target kinase in absence of said agent;
  d) confirming selective binding affinity of the said agent to the mutated sequence obtained under c) compared to said wild-type target kinase;
  e) confirming functional activity of the said mutated target kinase in absence of said agent;
  f) obtaining a mutated kinase sequence being sensitive to said agent which is not an inhibitor of the said wild-type target kinase (foreign kinase) with functional activity of the said wild-type target kinase in absence of said agent.

According to a further aspect, the invention provides a method for designing kinase mutants with reprogrammed sensitivity to specific inhibitors comprising the steps of:
  a) selecting a target kinase involved in a disease-related biological pathway;
  b) selecting an inhibitor of a kinase not being the target kinase (foreign kinase) having little or no affinity for the wild-type target kinase and having little cross-reactivity with other kinases than the foreign kinase;
  c) mutating the target kinase sequence to render it sensitive to said kinase inhibitor having little or no affinity for the wild-type target kinase, while keeping functional activity of the wild-type target kinase for the mutated target kinase in absence of said kinase inhibitor;
  d) confirming selective binding affinity of the said inhibitor to the mutated sequence obtained under c) compared to said wild-type target kinase;
  e) confirming functional activity of the said mutated target kinase in absence of said kinase inhibitor;
  f) obtaining a mutated kinase sequence being sensitive to a kinase inhibitor of a kinase not being the said wild-type target kinase (foreign kinase) and with functional activity of the said wild-type target kinase in absence of said kinase inhibitor.

According to a particular aspect, step c) can further comprise the steps of:
c1) calculating the total binding free energy and the contribution of each residue for the binding of the foreign kinase inhibitor to the foreign kinase;
c2) deriving from the total binding free energy and the contribution of each residue for the binding in the foreign kinase obtained in c1) possible mutations in the sequence of the wild-type target kinase;
c3) estimating the total binding free energy, and the contribution of each residue, for the binding of the foreign kinase inhibitor to the mutated target kinase.

The absolute binding free energy for the inhibitor/kinase association can be calculated using various methods including Molecular Mechanics-Generalized Born Surface Area (MM-GBSA) approach (Zoete et al., 2013, Zoete et al., 2013, *Front Immunol*, 4, 268; Zoete et al., 2005, *Proteins* 61: 79-93; Zoete et al., 2007, *Proteins*, 67: 1026-1047; Zoete et al., 2010, *J. Mol Recogn.*, 23: 142-152).

According to another particular aspect, step c) can further comprise the step of experimental yeast or phage display to design a mutated kinase of step c).

According to a further particular aspect, the mutated kinase sequences of the invention can be used to design expressing systems thereof for expressing the said mutated kinase which are useful in compositions and methods of the invention.

According to another aspect, the invention provides a method for reprogramming cell kinase sensitivity to specific inhibitors comprising the steps of:
a) selecting a target kinase involved in a disease-related biological pathway;
b) providing an expression system for a mutant of the said target kinase wherein the sequence of said mutant corresponds to the sequence of the target kinase wherein mutations have been introduced to render it sensitive to an inhibitor of a kinase not being the target kinase (foreign kinase), which inhibitor has little or no affinity for the wild-type target kinase and has little cross-reactivity with other kinases than the foreign kinase and wherein the said mutant retains the functional activity of the wild-type target kinase in absence of said kinase inhibitor;
c) modifying a cell of a living organism with an expression system under b) for inducing the said cell to produce a mutant of the target kinase;
d) obtaining a modified cell expressing a mutant of the target kinase, wherein the mutant of the target kinase has an activity essentially similar to the activity of the wild-type target kinase in absence of the inhibitor of the said foreign kinase and has an inhibited kinase activity compared to the wild-type target kinase in presence of said inhibitor of the said foreign kinase.

According to a further particular aspect, is provided a method of the invention wherein said inhibitor of kinase is a drug candidate.

According to a further particular aspect, is provided a method of the invention wherein said drug candidate is an approved drug.

According to another particular aspect, is provided a method of the invention for reprogramming cell kinase sensitivity to specific inhibitors, wherein said modified cells are to be administered in a subject in the need thereof in combination with said inhibitor of foreign kinase to control the activity of the modified cell, while not effecting the activity of the activity of the same non-modified cells.

For example, said method is used to control the killing activity of antigen-presenting cells in case of T-cell therapy or of cell proliferation activity in case of stem-cell therapy through the use of the specific inhibitors.

According to a particular aspect, is provided a method of the invention for reprogramming cell kinase sensitivity to specific inhibitors wherein the method is an ex vivo method. In particular, the modified cell obtained under step d) is isolated for preparing a pharmaceutical composition.

According to another particular aspect, is provided a method of the invention for reprogramming cell kinase sensitivity to specific inhibitors wherein the modified cell obtained under step c) ae administered to a living organism to induce in vivo the expression of the mutant of the target kinase under step d).

According to another particular aspect, is provided a method of the invention for reprogramming cell kinase sensitivity to specific inhibitors further comprising a step of modulating the kinase activity of said modified cell by contacting the said foreign kinase inhibitor with the said modified cell.

According to a particular aspect, the inhibitor of the kinase not being the target kinase (foreign kinase) can be selected among agents having a binding mode to their active site on the foreign kinase compatible with a binding in the active site of the target kinase. The above compatibility of binding modes can be assessed by for example molecular modelling, for instance by superimposing the 3D structure of the target kinase to that of the foreign kinase in complex with its inhibitor, and verifying that the binding of the foreign kinase inhibitor to the mutated target kinase would not require any significant conformational rearrangement of the target kinase. The complex between the foreign kinase and its inhibitor can be obtained by molecular docking.

According to another particular aspect, the inhibitor of the kinase not being the target kinase (foreign kinase) can be selected among inhibitors of a kinase having significant sequence difference in the binding site of the said inhibitor compared to the said target kinase.

According to another particular aspect, the inhibitor of the kinase not being the target kinase (foreign kinase) can be selected among agents that have no or limited side effects.

According to another particular aspect, the target kinase can be selected among kinases that are known to be involved in a disease-related biological pathway.

According to a further particular aspect, the target kinase is selected from those involved in the control of T-cells function.

According to a further particular aspect, the target kinase is selected from Zap-70 and Lck kinases.

According to a further particular aspect, the target kinase mutants are selected from the Zap-70 and Lck kinase mutants of the invention.

According to another further particular aspect, the target kinase is selected from proto-oncogene tyrosine-protein kinase Fyn (FYN), tyrosine-protein kinase CSK (or C-terminal Src kinase; CSK), tyrosine-protein kinase ITK/TSK (or interleukin-2-inducible T-cell kinase; ITK) and tyrosine-protein kinase ABL (ABL).

According to a further particular aspect, a drug candidate according to the invention is an inhibitor of a foreign kinase selected from a marketed, approved, developmental or investigational drug.

According to a further particular aspect, an inhibitor of a foreign kinase according to the invention is an agent selected from a marketed, approved, developmental or investigational drug.

Kinases According to the Invention

In one embodiment, is provided a kinase mutant obtainable by a method according to the invention.

In another further embodiment, is provided a Zap-70 kinase mutant comprising an amino acid sequence of SEQ ID NO: 1 wherein is introduced:
- (i) at least one mutation selected from: V399I, M414A, M414T, M414V, M416Y, M416V, M416L, M416I, M416F, M416W, M416H, M416T and M416S (mutated SEQ ID NO: 1 sequence), and
- (ii) optionally, at least one conservative substitution of at least one amino acid of the said mutated SEQ ID NO: 1 on at least one position selected from 342, 344-346, 350-354, 367-369, 386, 390, 399, 412-421, 424, 466-468 and 478-480 which was not mutated under (i).

In another further embodiment, is provided a Zap-70 kinase mutant comprising an amino acid sequence of SEQ ID NO: 1 wherein is introduced:
- (i) at least one mutation selected from selected from: M414A, M414T and M414V, and (ii) optionally, at least one conservative substitution of an amino acid of the said mutated SEQ ID NO: 1 on at least one position selected from 342, 344-346, 350-354, 367-369, 386, 390, 399, 412-413, 415-421, 424, 466-468 and 478-480.

In another further embodiment, is provided a Zap-70 kinase mutant comprising an amino acid sequence of SEQ ID NO: 1 wherein is introduced:
- (i) at least one mutation selected from: V399I, M414A, M414T, M414V, M416Y, M416V, M416L, M416I, M416F, M416W, M416H, M416T and M416S (mutated SEQ ID NO: 1 sequence), and (ii) optionally, at least one conservative substitution of at least one amino acid of the said mutated SEQ ID NO: 1 on at least one position selected from 342, 344-346, 350-354, 367-369, 386, 390, 399, 412-421, 424, 466-468 and 478-480 which was not mutated under (i), wherein when the at least one mutation under (i) is M414A, then at least one conservative as described under (ii) is present.

In another further embodiment, is provided a Zap-70 kinase mutant comprising an amino acid sequence of SEQ ID NO: 1 wherein are introduced:
- (i) at least one mutation selected from selected from: M414A, M414T and M414V and at least one mutation selected from V399I and M416Y, and
- (ii) optionally, at least one conservative substitution of an amino acid of the said mutated SEQ ID NO: 1 on at least one position selected from 342, 344-346, 350-354, 367-369, 386, 390, 399, 412-413, 415-421, 424, 466-468 and 478-480 which was not mutated under (i).

In another further embodiment, is provided a Zap-70 kinase mutant comprising an amino acid sequence of SEQ ID NO: 1 wherein are introduced:
- (i) at least the mutation M414V and at least one mutation selected from V399I and M416Y, and
- (ii) optionally, at least one conservative substitution of an amino acid of the said mutated SEQ ID NO: 1 on at least one position selected from 342, 344-346, 350-354, 367-369, 386, 390, 399, 412-413, 415-421, 424, 466-468 and 478-480 which was not mutated under (i).

In another further embodiment, is provided a Zap-70 kinase mutant comprising an amino acid sequence of SEQ ID NO: 1 wherein are introduced:
- (i) at least one mutation selected from selected from: M414A, M414T and M414V and the mutation V399I and the mutation M416Y, and
- (ii) optionally, at least one conservative substitution of an amino acid of the said mutated SEQ ID NO: 1 on at least one position selected from 342, 344-346, 350-354, 367-369, 386, 390, 412-413, 415, 417-421, 424, 466-468 and 478-480.

In another further embodiment, is provided a Zap-70 kinase mutant comprising an amino acid sequence of SEQ ID NO: 1 wherein are introduced:
- (i) at least the mutation M414V and the V399I and the mutation M416Y, and
- (ii) optionally, at least one conservative substitution of an amino acid of the said mutated SEQ ID NO: 1 on at least one position selected from 342, 344-346, 350-354, 367-369, 386, 390, 412-413, 415, 417-421, 424, 466-468 and 478-480.

In another further embodiment, is provided a Zap-70 kinase mutant having a mutated SEQ ID NO: 1 sequence according to the invention wherein said at least one conservative substitution of an amino acid of the said mutated SEQ ID NO: 1 on at least one of the positions selected from 342, 344-346, 350-354, 367-369, 386, 390, 399, 412-421, 424, 466-468 and 478-480 which was not mutated under (i) is a conservative substitution of about 1 to 10 amino acids at those positions, for example a conservative substitution of about 1 to 5 amino acids at those positions, for another example a conservative substitution of about two, three, four or five amino acids at those positions.

In another further embodiment, is provided a Zap-70 kinase mutant comprising the following amino acid sequence:

```
                                         (SEQ ID NO: 12)
Xaa1 Xaa2 Xaa3 Xaa4 Xaa5 Xaa6 Xaa7 Xaa8 Xaa9 Xaa10

Xaa11 Xaa12 Xaa13 Xaa14 Xaa15 Xaa16 Xaa17 Xaa18

Xaa19 Xaa20 Xaa21 Xaa22 Xaa23 Xaa24 Xaa25 Xaa26
``` wherein
Xaa1 is selected from V and I;
Xaa2 is selected from R, K, and H;
Xaa3 is selected from L, I, V, M, A, F and Y;
Xaa4 is selected from I, L, V, M, A, F and Y;
Xaa5 is selected from G, P and A;
Xaa6 is selected from V, I, M, L, F, A and P;
Xaa7 is selected from C, S, T and A;
Xaa8 is selected from Q and N;
Xaa9 is selected from A, V, L, I and P;
Xaa10 is selected from E and D;
Xaa11 is selected from A, V, L, I and P;
Xaa12 is selected from L, I, V, M, A, F and Y;
Xaa13 is selected from M, V, L, I and F;
Xaa14 is selected from L, I, V, M, A, F and Y;
Xaa15 is selected from V, I, M, L, F, A and P;
Xaa16 is selected from M, A, V and T;
Xaa17 is selected from E and D;
Xaa18 is selected from M, Y and L;
Xaa19 is selected from A, V, L, I and P;
Xaa20 is selected from G, P and A;
Xaa21 is selected from G, P and A;
Xaa22 is selected from G, P and A;
Xaa23 is selected from P. A and G;
Xaa24 is selected from L, I, V, M, A, F and Y;
Xaa25 is selected from H, K and R;
Xaa26 is selected from K, R and H;

wherein SEQ ID NO: 12 is a mutated sequence of a fragment of SEQ ID NO: 1 from position 399 to 424 and therefore not identical to SEQ ID NO: 1.

In another further particular embodiment is provided a Zap-70 kinase mutant comprising an amino acid sequence of SEQ ID NO: 12, wherein when Xaa1 is I, Xaa16 can be selected from M or a conservative substitution thereof (V, L, I or F) and/or Xaa18 can be selected from M or a conservative substitution thereof (V, L, I or F).

In another further particular embodiment is provided a Zap-70 kinase mutant comprising an amino acid sequence of SEQ ID NO: 12, wherein when Xaa16 is A, T or V, Xaa1 can be selected from V or a conservative substitution thereof (I, M, L, F, A or P) and/or Xaa18 can be selected from M or a conservative substitution thereof (V, L, I or F).

In another further particular embodiment is provided a Zap-70 kinase mutant comprising an amino acid sequence of SEQ ID NO: 12, wherein when Xaa18 is L or Y, Xaa1 can be selected from V or a conservative substitution thereof (I, M, L, F, A or P) and/or Xaa16 can be selected from M or a conservative substitution thereof (V, L, I or F).

In another further particular embodiment is provided a Zap-70 kinase mutant comprising an amino acid sequence selected from SEQ ID NO: 3, SEQ ID NO: 4, SEQ ID NO: 5, SEQ ID NO: 6, SEQ ID NO: 7 and SEQ ID NO: 8.

In another further particular embodiment is provided a Zap-70 kinase mutant comprising an amino acid sequence selected from SEQ ID NO: 5, SEQ ID NO: 6 and SEQ ID NO: 8.

In another further embodiment, is provided a Zap-70 kinase mutant according to the invention wherein at least one second mutation as described under (Hi) is present.

In another further embodiment, is provided a Lck kinase mutant comprising an amino acid sequence of SEQ ID NO: 2 wherein is introduced:
(a) at least one mutations selected from: T316V, T316S, Y318L, Y318W, Y318F, Y318H, Y318T, Y318S, S323C and S323A (mutated SEQ ID NO: 2 sequence) and
(b) optionally, at least one conservative substitution of at least one amino acid of the said mutated SEQ ID NO: 2 on at least one position selected from 251-253, 259, 261, 271-273, 288, 292, 301, 314-327, 330, 368-371, 381-383 which was not mutated under (a).

In another further embodiment, is provided a Lck kinase mutant comprising an amino acid sequence of SEQ ID NO: 2 according to the invention wherein is introduced under a) at least one mutation, said mutation being S323C.

In another further embodiment, is provided a Lck kinase mutant comprising an amino acid sequence of SEQ ID NO: 2 according to the invention wherein is introduced under a) at least two mutations, said mutation being S323C and Y318L.

In another further embodiment, is provided a Lck kinase mutant having a mutated SEQ ID NO: 2 sequence according to the invention wherein said at least one conservative substitution of an amino acid of the said mutated SEQ ID NO: 2 on at least one of the positions selected from 251-253, 259, 261, 271-273, 288, 292, 301, 314-327, 330, 368-371, 381-383 which was not mutated under (a) is a conservative substitution of about 1 to 10 amino acids at those positions, for example a conservative substitution of about 1 to 5 amino acids at those positions, for another example a conservative substitution of about two, three, four or five amino acids at those positions.

In another further embodiment, is provided a Lck kinase mutant comprising the following amino acid sequence (SEQ ID NO: 13)
Xab1 Xab2 Xab3 Xab4 Xab5 Xab6 Xab7 Xab8 Xab9 wherein
Xab1 is selected from T, V and S;
Xab2 is selected from E and D;
Xab3 is selected from Y and L;
Xab4 is selected from M, V, L, I and F;
Xab5 is selected from E and D;
Xab6 is selected from N and Q;
Xab7 is selected from G, P and A;
Xab8 is selected from S, C, T and A;
Xab9 is selected from L, I, V, M, A, F and Y;
wherein SEQ ID NO: 13 is a mutated sequence of a fragment of SEQ ID NO: 2 from position 316 to 324 and therefore not identical to SEQ ID NO: 2.

In another further particular embodiment is provided a Lck kinase mutant comprising an amino acid sequence of SEQ ID NO: 13, wherein when Xab1 is V. Xab3 can be selected from Y or a conservative substitution thereof (W, F, T or S) and/or Xab8 can be selected from S or a conservative substitution thereof (T, A or C).

In another further particular embodiment is provided a Lck kinase mutant comprising an amino acid sequence of SEQ ID NO: 13, wherein when Xab3 is L, Xab1 can be selected from T or a conservative substitution thereof (S) and/or Xab8 can be selected from S or a conservative substitution thereof of (T, A or C).

In another further particular embodiment is provided a Lck kinase mutant comprising an amino acid sequence of SEQ ID NO: 13, wherein when Xab8 is C, Xab1 can be selected from T or a conservative substitution thereof (S) and/or Xab3 can be selected from Y or a conservative substitution thereof (W, F, T or S).

In another further particular embodiment, is provided a Lck kinase mutant comprising an amino acid sequence selected among: SEQ ID NO: 9, SEQ ID NO: 10 and SEQ ID NO: 11.

In another further particular embodiment, is provided a Lck kinase mutant comprising an amino acid sequence selected from SEQ ID NO: 11 and SEQ ID NO: 20.

Nucleic Acids of the Invention

Isolated nucleic acid encoding a kinase mutant according to the invention may be, for instance, natural DNA or RNA or a recombinant or synthetic DNA, RNA or LNA or a recombinant nucleic acid molecule. For example isolated nucleic acid encoding a kinase mutant of the invention comprises any of the nucleic acid molecules according to the invention either alone or in combination.

In a particular embodiment, is provided an isolated nucleic acid molecule encoding at least one, and in particular one, kinase mutant according to the invention.

In a more particular embodiment, is provided an isolated nucleic acid molecule encoding a kinase according to the invention, wherein the said nucleic acid molecule is selected from SEQ ID NO: 14, SEQ ID NO: 15, SEQ ID NO: 16, SEQ ID NO: 17, SEQ ID NO: 18, SEQ ID NO: 19.

Vectors and Methods for Cell Transduction

In one embodiment, the invention provides a recombinant vector comprising a nucleic acid molecule encoding at least one kinase mutant according to the invention.

In one embodiment, the invention provides a recombinant expression vector comprising a nucleic acid molecule according to the invention, wherein the vector optionally comprises an expression controlling sequence, allowing expression in eukaryotic host cells of the encoded sequence, operably linked to said nucleic acid molecule.

Numerous expression systems can be used, including without limitation chromosomes, episomes, plasmids, and virus-derived vectors. More particularly, the recombinant vectors used can be derived from bacterial plasmids, transposons, yeast episomes, insertion elements, yeast chromosome elements, viruses such as baculovirus, papilloma viruses such as SV40, vaccinia viruses, adenoviruses, fox pox viruses, pseudorabies viruses, retroviruses, lentiviruses, adeno-associated viruses (AAV).

In a particular embodiment, the recombinant vector is a lentiviral vector.

A recombinant expression vector according to the invention may comprise nucleic acid molecules encoding for one or more than one of kinase mutant of the invention.

The nucleic acid sequence can be inserted in the recombinant expression vector by methods well known to a person skilled in the art such as, for example, those that are described in Molecular Cloning: *A Laboratory Manual*, Sambrook et al., 4" Ed., Cold Spring Harbor Laboratory Press, Cold Spring Harbor, N.Y., 2001.

Recombinant vectors can include nucleotide sequences that allow, control or regulate the expression and the transcription of a polynucleotide of the invention as well as the translation of a kinase of the invention, these sequences being selected according to the host cells that are used.

In a further embodiment, is provided a host cell comprising a recombinant vector according to the invention.

According to a particular embodiment, said host cell is a T cell, in particular a T cell engineered to express at least a cancer related TCR or a chimeric antigen receptor (CAR).

The introduction of the recombinant vector in a host cell can be carried out according to methods that are well known to a person skilled in the art, such as those described in *Basic Methods in Molecular Biology*, Davis et al., $2^{nd}$ ed., McGraw-Hill Professional Publishing, 1995, and Molecular Cloning: A Laboratory Manual, supra, such as transfection by calcium phosphate, transfection by DEAE dextran, transfection, microinjection, transfection by cationic lipids, electroporation, transduction or infection.

According to a particular embodiment is provided a cell expressing at least one kinase mutant according to the invention.

According to a particular aspect, cells of the invention are selected from T cells, T-cells targeting antigen-presenting cancer cells, such as tumors infiltrating T-cells (TIL) and engineered T-cells (producing an optimized TCR or a CAR).

According to an embodiment, the invention provides a T cell expressing at least one kinase mutant according to the invention and at least one cancer related T-cell receptor. Examples of cancer related T-cell receptor are TRC BC1 (β-chain of an HLA-A*0201-restricted NY-ESO-1157-165-specific TCR (Irving et al., 2012, supra).

According to an embodiment, is provided a cell composition comprising isolated cells of the invention.

According to one embodiment, the expression level of kinase mutants can be measured by methods such as Western Blot.

In another embodiment, the invention provides cells expressing at least one kinase mutant of the invention wherein the mutant has a kinase activity essentially similar to the activity of the wild-type target kinase in absence of the inhibitor of the said foreign kinase and has an enhanced ability to respond to selected foreign kinase inhibitors as compared to non-modified cells (i.e. expressing the kinase wild-type but not expressing the kinase mutant of the invention). The kinase response of the cells expressing at least one kinase mutant of the invention as compared to the response to the wild-type cells can be assessed by methods such as testing cells' ability of production of IL-2 or cell viability in cell-based assay.

In a particular aspect, is provided a process for producing a cell capable of expressing at least one kinase mutant of the invention, comprising contacting said cell with a vector or a nucleic acid according to the invention.

According to a particular aspect is provided an ex vivo method (i.e. in culture) of inducing expression of at least one kinase mutant of the invention in a cell, in particular a T cell, comprising a step of ex vivo transducing said cell with a vector according to the invention.

Another aspect of the invention provides a method of inducing in vivo the expression of at least one kinase mutant of the invention in a cell, in particular a T cell, in a subject in need thereof, said method comprising the step of administering a vector encoding at least one kinase mutant according to the invention to said subject under suitable conditions for inducing transduction of the subject's cells in vivo with said vector.

Methods and Uses According to the Invention

Kinase mutants and methods of expressing thereof advantageously allow to reprogram the activity of target kinases in cells in rendering them sensitive to an inhibitor of another kinase than said target kinase (foreign kinase) and thereby allow controlling the activity of a biological pathway through the combined use of cells expressing kinase mutants of the invention and said inhibitor of said foreign kinase, without affecting the same biological pathway in cells not expressing the kinase mutants of the invention since the activity of the biological pathway of interest is altered reversibly in modified cells expressing the kinase mutant of the invention upon administration of the kinase inhibitor, while the activity of said pathway will remain unchanged in non-modified cells. This is particularly useful since this method can be applied not only directly to cells at the origin of the disorder but also indirectly be applied to cells involved in the control or destruction of the disease-related cells such as cells from the immune system. The activity of a target biological pathway can be controlled via the administration of a kinase inhibitor and through a window of time of its effect.

Another aspect of the invention provides mutated kinases of the invention, isolated cells expressing at least one of those mutated kinases or recombinant vectors comprising a nucleic acid molecule encoding at least one of those mutated kinases which are useful for controlling the activity of the cells expressing those and in particular for use in the treatment of a disorder or disease, in particular cancer, in combination with a specific kinase inhibitor.

According to a particular aspect, the invention provides mutated kinase mutants obtainable according to the invention, a recombinant vector expressing at least one of said mutants, an isolated cell expressing at least one said kinase mutants for use in the treatment of a disorder or disease selected from cancer, autoimmune diseases, asthma, diabetes, inflammatory diseases and neurodegenerative diseases or during or after an organ transplant.

According to a particular aspect, the invention provides mutated kinase mutants obtainable according to the invention, a recombinant vector expressing at least one of said mutants, an isolated cell expressing at least one said kinase mutants for controlling the activity of a cell expressing said at least one mutants.

According to a particular aspect, the invention provides mutated kinase mutants obtainable according to the invention, a recombinant vector expressing at least one of said mutants, an isolated cell expressing at least one said kinase mutants for use in a method of treatment of the invention or a method of controlling the activity of a cell expressing said at least one mutants according the invention, in combination with a specific kinase inhibitor wherein said at least one kinase inhibitor is erlotinib.

According to a particular aspect, the invention provides mutated kinase mutants obtainable according to the invention, a recombinant vector expressing at least one of said mutants, an isolated cell expressing at least one said kinase mutants for use in a method of treatment of the invention or a method of controlling the activity of a cell expressing said at least one mutants according the invention, in combination with a specific kinase inhibitor wherein said at least one kinase inhibitor is gefitinib.

According to another aspect, the invention provides a method of inducing expression of at least one kinase mutant of the invention in a cell comprising the step of transducing said cell with a vector according to the invention. The method of inducing expression of at least one kinase mutant of the invention in cells can be an ex vivo or in vivo method.

Another aspect of the invention provides a method of treating a disorder or disease in a subject in need thereof, said method comprising administering an effective amount of mutated kinases of the invention, of isolated cells expressing at least one of those mutated kinases or of a recombinant vector comprising a nucleic acid molecule encoding at least one of those mutated kinases, in a subject in need thereof.

According to another particular aspect, mutated kinases of the invention, isolated cells expressing at least one of those mutated kinases or recombinant vectors comprising a nucleic acid molecule encoding at least one of those mutated kinases are useful in the treatment of diseases selected from cancer, autoimmune diseases, asthma, diabetes, infectious and inflammatory diseases, neurodegenerative diseases or during or after an organ transplant or stem cell therapy.

According to a further particular aspect, mutated kinases of the invention, isolated cells expressing at least one of those mutated kinases or recombinant vectors comprising a nucleic acid molecule encoding at least one of those mutated kinases am useful in the treatment of cancer subjects, in particular by cancer immunotherapy, in particular through adoptive cell therapy. According to a particular aspect, the activity of the isolated cells expressing at least one of those mutated kinases or recombinant vectors comprising a nucleic acid molecule encoding at least one of those mutated kinases can be modulated (down or up-regulated, depending on the target mutation) in immunotherapy of cancer based on the (re)introduction of such cells in patients.

According to another further particular aspect, is provided a method of treatment of a cancer subject through adoptive cell therapy wherein engineered T cells for expressing at least one cancer related TCR are further engineered to express at least one kinase mutant of the invention. In a further particular aspect, those cells are engineered autologous cells, i.e. originating from the subject to be treated and being engineered.

According to another particular aspect, mutated kinases of the invention, isolated cells expressing at least one of those mutated kinases or recombinant vectors comprising a nucleic acid molecule encoding at least one of those mutated kinases are useful in the treatment of side effects of an organ transplant in a subject in need thereof.

In a particular embodiment, is provided an in vivo method of inducing expression of a kinase mutant of the invention in a cell, comprising the step of delivering a kinase-expressing vector via systemic (e.g., intravenous) or local (e.g., intra-tumoral, peri-tumoral, lymphnodal, etc.) routes to a cancer subject.

According to another particular aspect, is provided a Zap-70 kinase mutant or a Lck kinase mutant or a recombinant vector comprising a nucleic acid molecule encoding said kinase mutant or an isolated cell expressing said kinase mutant or a composition thereof according to the invention for use in combination with at least one kinase inhibitor selected from erlotinib, vandetanib, gefitinib and afatinib, in particular erlotinib, vandetanib and gefitinib for controlling the activity of a cell expressing those, in particular for use in the treatment of a disorder or disease selected from a cancer, an autoimmune disease or disorder, asthma, diabetes, an infectious or inflammatory disease, a neurodegenerative disease or during or after an organ transplant or a stem cell therapy.

According to another particular aspect, is provided a Zap-70 kinase mutant or a Lck kinase mutant or a recombinant vector comprising a nucleic acid molecule encoding said kinase mutant or an isolated cell expressing said kinase mutant or a composition thereof according to the invention for use in combination with at least one kinase inhibitor selected from erlotinib, vandetanib, gefitinib and afatinib, in particular erlotinib, vandetanib and gefitinib for controlling the activity of a cell expressing those, in particular for use in the treatment of a disorder or disease selected from a cancer, an autoimmune disease or disorder, asthma, diabetes, an infectious or inflammatory disease, a neurodegenerative disease or during or after an organ transplant or a stem cell therapy, wherein said Zap-70 kinase mutant comprises an amino acid sequence of SEQ ID NO: 1 wherein is introduced (i) at least one mutation selected from: V399I, M414A, M414T, M414V, M416Y, M416V, M416L, M416I, M416F, M416W, M416H, M416T and M416S (mutated SEQ ID NO: 1 sequence), and (ii) optionally, at least one conservative substitution of at least one amino acid of the said mutated SEQ ID NO: 1 on at least one position selected from 342, 344-346, 350-354, 367-369, 386, 390, 399, 412-421, 424, 466-468 and 478-480 which was not mutated under (i) and wherein said Lck kinase mutant comprises an amino acid sequence of SEQ ID NO: 2 wherein is introduced (a) at least one mutations selected from: T316V, T316S, Y318L, Y318W, Y318F, Y318H, Y318T, Y318S, S323C and S323A (mutated SEQ ID NO: 2 sequence) and (b) optionally, at least one conservative substitution of at least one amino acid of the said mutated SEQ ID NO: 2 on at least one position selected from 251-253, 259, 261, 271-273, 288, 292, 301, 314-327, 330, 368-371 and 381-383 which was not mutated under (a).

According to another particular embodiment, Zap-70 kinase mutants of the invention comprising an amino acid sequence selected from SEQ ID NO: 3, SEQ ID NO: 4, SEQ ID NO: 5, SEQ ID NO: 6, SEQ ID NO: 7 and SEQ ID NO: 8, isolated cells (e.g. T-cells) expressing at least one of those mutants or of a recombinant vector comprising a nucleic acid molecule encoding at least one of those mutants are particularly useful in a treatment according to the invention in combination with a kinase inhibitor selected from Vandetanib and Erlotinib.

According to a further particular embodiment, Zap-70 kinase mutants of the invention comprise an amino acid sequence selected from SEQ ID NO: 5, SEQ ID NO: 6, SEQ ID NO: 7 and SEQ ID NO: 8.

According to a further particular embodiment, Zap-70 kinase mutants of the invention comprising an amino acid sequence selected from SEQ ID NO: 3 and SEQ ID NO: 8, isolated cells (e.g. T-cells) expressing at least one of those mutants or of a recombinant vector comprising a nucleic acid molecule encoding at least one of those mutants are particularly useful in a treatment according to the invention in combination with Vandetanib.

According to another further particular embodiment, Zap-70 kinase mutants of the invention comprising an amino acid sequence of SEQ ID NO: 8, isolated cells (e.g. T-cells) expressing at least one of those mutants or of a recombinant vector comprising a nucleic acid molecule encoding at least one of those mutants are particularly useful in a treatment according to the invention in combination with Vandetanib.

According to another further particular embodiment, Zap-70 kinase mutants of the invention comprising an amino acid sequence selected from SEQ ID NO: 6 and SEQ ID NO: 8, isolated cells (e.g. T-cells) expressing at least one of those mutants or of a recombinant vector comprising a nucleic acid molecule encoding at least one of those mutants are particularly useful in a treatment according to the invention in combination with Erlotinib.

According to another further particular embodiment, Zap-70 kinase mutants of the invention comprising an amino acid sequence selected from SEQ ID NO: 5, SEQ ID NO: 7 and SEQ ID NO: 8, isolated cells (e.g. T-cells) expressing at least one of those mutants or of a recombinant vector comprising a nucleic acid molecule encoding at least one of those mutants are particularly useful in a treatment according to the invention in combination with Erlotinib.

In another further embodiment, Lck kinase mutants of the invention comprising an amino acid sequence selected from SEQ ID NO: 9 and SEQ ID NO: 10, isolated cells (e.g. T-cells) expressing at least one of those mutants or of a recombinant vector comprising a nucleic acid molecule encoding at least one of those mutants are particularly useful in a treatment according to the invention in combination with a kinase inhibitor selected from Gefitinib and Erlotinib.

In another further embodiment, Lck kinase mutant of the comprising an amino acid sequence of SEQ ID NO: 11, isolated cells (e.g. T-cells) expressing at least one of those mutants or of a recombinant vector comprising a nucleic acid molecule encoding at least one of those mutants are particularly useful in a treatment according to the invention in combination with Erlotinib.

In another further embodiment, Lck kinase mutants of the invention comprising an amino acid sequence selected from SEQ ID NO: 11 and SEQ ID NO: 20, isolated cells (e.g. T-cells) expressing at least one of those mutants or of a recombinant vector comprising a nucleic acid molecule encoding at least one of those mutants are particularly useful in a treatment according to the invention in combination with Gefitinib.

In another further embodiment, Lck kinase mutant of the invention, isolated cells (e.g. T-cells) expressing at least one of those mutants or of a recombinant vector comprising a nucleic acid molecule encoding at least one of those mutants are used in a treatment according to the invention in combination with Afatinib.

Compostions According to the Invention

Pharmaceutical compositions or formulations according to the invention may be administered as a pharmaceutical formulation, which contains kinase mutant-expressing vectors or isolated cells as described herein.

Another aspect of the invention provides a pharmaceutical composition comprising cells of the invention and at least one pharmaceutically acceptable agent able to inhibit the activation of the cell.

The invention provides pharmaceutical or therapeutic cells as compositions and methods for treating a subject, preferably a mammalian subject, and most preferably a human patient who is suffering from a cancer, in particular through adoptive cell therapy.

The compositions according to the invention, together with a conventionally employed adjuvant, carrier, diluent or excipient may be placed into the form of pharmaceutical compositions and unit dosages thereof, and in such form may be employed as solids, such as tablets or filled capsules, or liquids such as solutions, suspensions, emulsions, elixirs, or capsules filled with the same, all for oral use, or in the form of sterile injectable solutions for parenteral use by injection or continuous infusion. Injectable compositions are typically based upon injectable sterile saline or phosphate-buffered saline or other injectable carriers known in the art. Such pharmaceutical compositions and unit dosage forms thereof may comprise ingredients in conventional proportions, with or without additional active compounds or principles, and such unit dosage forms may contain any suitable effective amount of the active ingredient commensurate with the intended dosage range to be employed.

Compositions of this invention may also be formulated as a depot preparation, which may be administered by implantation or by intramuscular injection.

The compounds of this invention can also be administered in sustained release forms or from sustained release drug delivery systems.

According to a particular embodiment, compositions according to the invention are for intravenous use, intratumoral use, subcutaneous use or intralymphnodal use.

In another particular aspect, compositions according to the invention are adapted for delivery by single administration.

According to a particular embodiment, compositions of the invention are veterinary compositions.

In another aspect, the invention provides compositions comprising vectors according to the invention.

In another aspect, the invention provides compositions comprising kinase mutant-expressing cells according to the invention.

Further materials as well as formulation processing techniques and the like are set out in Part of Remington's "The Science and Practice of Pharmacy", 22$^{nd}$ Edition, 2012, University of the Sciences in Philadelphia, Lippincott Williams & Wilkins, which is incorporated herein by reference.

Mode of Administration

Vectors, cells and formulations thereof according to this invention may be administered in any manner including parenterally, intravenously, intratumorally, subcutaneously, intra-dermally, rectally, by direct tissue perfusion during surgery, or combinations thereof. Parenteral administration includes, but is not limited to, intravenous, intra-arterial, intra-peritoneal, subcutaneous and intramuscular. The compositions of this invention may also be administered in the form of an implant, which allows slow release of the compositions as well as a slow controlled i.v. infusion.

The kinase inhibitors can be administered before, concomitantly or sequentially the administration of the vectors, cells or formulations thereof according to the invention via the same or a different route.

Combination

According to the invention, the vectors and cells according to the invention, and pharmaceutical formulations thereof, can be administered alone or in combination with a co-agent.

The invention encompasses the administration of vectors or cells, pharmaceutical formulations thereof, or composition according to the invention, wherein said vectors or cells or compositions are administered to an individual prior to, simultaneously or sequentially with other therapeutic regimens, such as for example co-agents useful in the treatment of a cancer, in a therapeutically effective amount.

Cells or composition according to the invention, or the pharmaceutical formulation thereof, that are administered simultaneously with said co-agents can be administered in the same or different composition(s) and by the same or different route(s) of administration.

Kits

According to another aspect of the invention, is provided a kit comprising at least one mutated kinases of the invention, isolated cells expressing at least one of those mutated kinases of the invention or recombinant vectors comprising a nucleic acid molecule encoding at least one of those mutated kinases and optionally instructional material.

According to a further embodiment, the kit according to the invention comprises at least one recombinant expression vector.

According to a further embodiment, the kit according to the invention comprises at least one recombinant expression vector and at least one agent kinase inhibitor.

According to a particular aspect, the kits of the invention are useful in the methods of the invention, in particular in the preparation of pharmaceutical compositions according to the invention or in methods of screening of therapeutic agents, in particular kinase inhibitors.

Patients

In an embodiment, patients according to the invention are suffering from asthma, diabetes, an infectious disease such as tuberculosis, an inflammatory disease, an autoimmune disease or disorder, a neurodegenerative disease such as Parkinson's disease or a cancer.

In an embodiment, patients according to the invention are subject of an organ transplant.

In an embodiment, patients according to the invention are suffering from any type of disease or disorder that can be treated by cell-based therapy, including but not limited to a cancer, an infectious or inflammatory disease, a neurodegenerative disease and acute heart damage.

In a further embodiment, patients according to the invention are suffering from a cancer.

In a particular embodiment, subjects according to the invention are suffering from a cancer selected from melanoma, breast cancer, ovarian cancer, prostate cancer, pancreatic cancer, brain cancer, kidney cancer, spinal cancer, non-Hodgkin lymphoma, leukemia and myeloma. in another embodiment, patients according to the invention are undergoing stem cell therapy.

In a further embodiment, patients according to the invention are undergoing stem cell therapy for tissue regeneration such as corneal regeneration.

References cited herein are hereby incorporated by reference in their entirety. The present invention is not to be limited in scope by the specific embodiments and drawings described herein, which are intended as single illustrations of individual aspects of the invention, and functionally equivalent methods and components are within the scope of the invention.

EXAMPLES

The following abbreviations refer respectively to the definitions below: 293T cells (cells isolated from human embryonic kidneys and transformed with large T antigen); $\Delta\Delta G_{bind,sum}$ (a difference between binding free energy sum for wild type and mutated system); ALK (anaplastic lymphoma kinase); c-Met (hepatocyte growth factor receptor, also known as HGFR); DMSO (dimethyl sulfoxide); EML (echinoderm microtubule protein); EGFR (epidermal growth factor receptor or ErbB-1); ErbB-2 (Receptor tyrosine-protein kinase erbB-2, also known as CD340); ErbB-4 (Receptor tyrosine-protein kinase erbB-4); FDA (U.S. Food and Drug Administration); IL-2 (interleukin 2); $K_D$ (equilibrium dissociation constant); L1, L2, L4, L7 (Lck mutants experimental IDs); LWT (Lck wild-type kinase); $OD_{450}$ (optical density, wavelength 450 nm); P116 cells (T cell line deficient for Syk and Zap-70); PDB ID (Protein Data Bank identification); RET (receptor tyrosine kinase); Ros1 (c-ros oncogene 1); Syk (Spleen tyrosine kinase); TKI (tyrosine kinase inhibitor); VEGFR (vascular endothelial growth factor receptor); WT (wild type); Z1-Z3, Z8-Z10 (ZAP-70 mutants experimental IDs); ZWT (ZAP-70 wild-type kinase)

Example 1: Selection of Kinase Inhibitors for Use in Kinase Engineering

Different kinase inhibitors that are FDA-approved or are advanced in clinical trials can be used in a method of design of kinase mutants according to the invention. For example, the kinase ligand can be selected according to the following criteria:

agent which is FDA-approved or advanced in clinical trials, ensuring its possible use in human;

agent having little or no affinity for the wild-type target kinase (e.g. for ZAP-70 and/or Lk), ensuring that non-reprogrammed cells will not be affected by them;

agent having little cross-reactivity with other kinases than the foreign kinase (other than the target kinase), and limited known side effects;

agent having available experimentally determined binding mode to the foreign kinase they target, to ensure that this binding mode is compatible with a binding in the active site of the kinase to be mutated, i.e. to ensure that no large conformational change of the reprogrammed kinase is necessary to bind the selected kinase inhibitor;

agent bind to foreign kinase that have significant sequence differences in the active site compared to the target kinase, to ensure that the lack of binding in the wild-type target kinase to be reprogrammed is due to the presence of sub-optimal residues potentially to be engineered, rather than a to a conformational rearrangement.

Experimental structures of the kinase/inhibitor complexes from the Protein Data Bank (PDB) are collected (Bermanet et al., 2000, *Nucleic Acids Res.*, 28, 235 242) and for each inhibitor, it has been checked how many kinases it is known to bind to, with an affinity ($K_D$) (i) lower than µM and (ii) lower than 100 nM, to estimate the selectivity profile (Davis et al., 2011, *Nat. Biotechnol.*, 29: 1046-1051). The toxicity information is recorded based Toxicity Flags ACToR (EPA), the Material Safety Data Sheet (MSDS) of the FDA and DrugBank (Wishart et al., 2006, *Nucleic Acids Res.*, 34, D668-D672). Any known experimental affinity of each kinase inhibitors for the wild-type target kinase to be reprogrammed, e.g. ZAP-70 or Lck is retrieved.

A first filtering is made on kinase inhibitors on this basis.

In the second step, all available experimental 3D structures of each kinase/kinase inhibitor complex from a short list obtained by a first filtering step is then superimposed to a list of representative experimental 3D structures of the wild-type kinases e.g. Zap-70 (PDB IDs: 1U59 and 2OZO) and Lck (PDB IDs: 3AD5, 3BYM, 3AC1, 2OF2).

Were retained only the kinase inhibitors for which binding in their targeted kinase (foreign kinase) does not require any significant conformational rearrangement of the latter compared to that of the target kinase for being mutated (e.g. Zap-70 or Lck), notably for the activation loop, the P-loop and the hinge domain. The kinase inhibitors whose primary target (foreign kinase) does not show any significant sequence difference in the active site compared to that of the target kinase to be mutated (e.g. Zap-70 or Lck) were excluded. These two criteria are necessary to ensure that the lack of binding of the kinase inhibitor to the wild-type target kinase is due to some residues that could be modified, and not to a global conformational change.

For Zap-70, the following kinase inhibitors were selected Afatinib, Erlotinib, Lapatinib, Neratinib and Vandetanib. For Lck, the following compounds were selected Afatinib, Erlotinib, Gefitinib and possibly Neratinib (Tables 2 and 3).

Example 2: Design and Characterization of Binding of Kinase Mutants

Several mutants of Zap-70 and Lck were designed according to the method of the invention and the binding free energy change for their binding to selected compounds was calculated.

Docking of selected kinase inhibitors in Zap-70 and Lck Kinase inhibitors selected after second step in Example 1 (step b) of the method of the invention for designing a kinase mutant) i.e. Afatinib, Erlotinib, Lapatinib, Neratinib, Vandetanib and Gefitinib were docked into the experimental 3D structure of Zap-70 and Lk, using the PDB files 1U59 and 3AD5, respectively. This allows verifying that the calculated binding mode, i.e. the position, conformation and orientation, of the ligand into the wild-type kinase, e.g. Zap-70 or Lck active sites is similar to the one observed experimentally for these kinase inhibitors in their respective primary target kinases, despite the lower affinity. This ensures that these small molecules have the potential to bind into the target wild-type kinase, e.g. Zap-70 and Lk in the binding modes they were developed for, and that a strong binding to Zap-70 or Lck can potentially be established by simple kinase mutations. Secondly, the calculated binding modes can be used to visually check the existing interactions between the ligand and the kinase, design kinase sequence modifications to enhance the binding, and finally to start the binding free energy estimations described below.

A consensus approach was used for the docking, which consists in using 3 different docking programs: Autodock 4.2 (Morris et al., 2008, *Curr Protoc Bioinformatics*, Chapter 8, Unit 8.14), Autodock Vina (Trott et al., 2009, *J Comput Chem*, 31: 455-461) and in house Attracting Cavities approach (Zoete et al. 2016, *J Comput Chem*, 37: 437-447) to verify the consistency of the predictions.

All approaches predicted a binding mode for these ligands in Zap-70 or Lck kinases similar to the one they have in their respective primary targets (foreign kinases).

Computer-Aided Design of Sequence Modifications of Target Kinases to Increase the Affinity for the Selected Kinase Inhibitors To design kinase mutants (steps c1) to c3) of the method of the invention for designing a kinase mutant), in particular Zap-70 and Lck kinase mutants, sequence modifications able to increase the affinity of the selected ligands (foreign kinase inhibitors) for these target kinases, a computer-aided protein engineering strategy similar to the strategy setup to design T-cell receptors with optimized affinities for cancer antigens was used as described in Zoete et al., 2013, supra). This approach comprises:
1. estimating the total binding free energy, and the contribution of each residue, for the binding of the kinase inhibitor to the wild-type target kinase;
2. using this quantitative information, along with the predicted binding mode of the kinase inhibitor into the wild-type target kinase, to design potential sequence modifications of the wild-type kinase able to increase the affinity;
3. introducing virtually these mutations into the wild-type target kinase, and estimating the total binding free energy, and the contribution of each residue, for the binding of the kinase inhibitor to the mutated target kinase; and
4. comparing the binding free energy changes between the wild-type and mutated target kinase for the kinase inhibitor binding, to select for experimental assay the sequence modifications calculated to increase the affinity for the kinase inhibitor.

The absolute binding free energy for the inhibitor/kinase association was calculated using the Molecular Mechanics—Generalized Born Surface Area (MM-GBSA) approach (Zoete et al., 2013, supra; Zoete et al., 2005, supra; Zoete et al., 2007, supra; Zoete et al., 2010, supra). In MM-GBSA, the binding free energy, $\Delta G_{bind}$, is written as the sum of the gas phase contribution, $\Delta H_{bind}^{gas}$, the desolvation free energy of the system upon binding, $\Delta G_{desolv}$, and an entropic contribution, $-T\Delta S$:

$$G_{bind} = <H_{bind}^{gas}> + <G_{desolv}> - <TS> \quad (1)$$

The brackets, < >, indicate an average of these energy terms along a Molecular Dynamics (MD) simulation trajectory of the inhibitor/kinase complex. MD simulations, each 2 ns in length, were performed using the CHARMM (v36) program and the CHARMM27 force field, in explicit solvent using the TIP3P model for water molecules, at 300 K. Stochastic boundary conditions (SBC) were used to restrain the water molecules around the protein. Energy terms were averaged over 200 frames regularly separated by 10 ps for each MD simulation, and were further averaged over 3 independent MD simulations. The entropy was neglected to save time and resources. It was demonstrated that the entropy term is useful to get a precise estimate of residue contribution to the binding, but is not mandatory for protein or peptide engineering (Zoete et al., 2007, supra).

The gas-phase contribution to the binding free energy is equal to the sum of the van der Waals and electrostatic interaction energies between the ligand and the kinase, $\Delta H_{vdw}$ and $\Delta H_{elec}$. $\Delta G_{desolv}$, is the difference between the solvation free energy, $\Delta G_{solv}$, of the complex and that of the isolated parts (i.e. ligand and kinase taken separately). The solvation free energy, $\Delta G_{solv}$ is divided into the electrostatic, $\Delta G_{elec,solv}$, and the nonpolar, $\Delta G_{np,solv}$, contributions:

$$\Delta G_{solv} = \Delta G_{elec,solv} + \Delta G_{np,solv} \quad (2)$$

$\Delta G_{elec,solv}$, which can be considered as the sum of a cavity term and a solute-solvent van der Waals term, is assumed to be proportional to the solvent accessible surface area, (SASA):

$$\Delta G_{np,solv} = \gamma SASA + b. \quad (3)$$

A value of 0.0072 kcal/(mol Å²) for $\gamma$ and 0 for b. The electrostatic contribution to the solvation free energy, $\Delta G_{elec,solv}$, was calculated using the analytical generalized Born (GB) GB-MV2 implicit solvent model (Lee et al., 2003, *J Comput Chem*, 24: 1348-1356) implemented in CHARMM (Chemistry at Harvard Macromolecular Mechanics). The use of a GB equation not only reduces the computing time, but also allows one to decompose the electrostatic contribution to the binding free energy on a per-atom basis in a straightforward manner. This allows decomposing the binding free energy into contributions coming from each residue (Zoete et al., 2007, supra). According to previous research in protein engineering (Zoete et al., 2013, supra; Zoete et al., 2005, supra; Zoete et al., 2010, supra), it was found and applied that a better estimation of the effect of a mutation on the binding free energy is obtained by:

summing the contribution of the residue of interest with those of all residues in direct contact;

calculating this sum for the wild type system, $G_{bind,sum}^{wt}$, and the mutated system $G_{bind,sum}^{mutant}$, averaged along SBC simulations centered on the residue of interest (i.e. 6 MD simulations are thus performed for each mutant: 3 for the wild-type system and 3 for the mutated system);

calculating the difference between the mutated and wild-type systems:

$$G_{bind,sum} = G_{bind,sum}^{mutant} G_{bind,sum}^{wt} \quad (4)$$

If $\Delta\Delta G_{bind,sum}$ is negative, than the mutation is expected to be favorable to the binding. All energy terms were calculated with CHARMM (v36).

Several mutations of Zap-70 and Lck were designed that are listed in Tables 2 to 3 along with the calculated binding free energy change upon mutation for several kinase inhibitors. The activity on the wild-type (ZWT) Zap-70/Lck is also given.

The designed mutations of Zap-70 and corresponding calculated binding free energy change ($\Delta\Delta G_{bind,sum}$) for the binding of Vandetanib or Erlotinib to Zap-70 are shown in Table 2 below.

TABLE 2

| Mutation in human Zap-70 | $\Delta\Delta G_{bind,sum}$ (kcal/mol) (Erlotinib) | $\Delta\Delta G_{bind,sum}$ (kcal/mol) (Vandetanib) | Compound |
|---|---|---|---|
| None (Wild-Type) | 0.0 | 0.0 | ZWT |
| M414A | −2.0 | −3.2 | Z1 |
| M414T | −3.8 | −1.5 | Z2 |
| M414V | −2.9 | −4.3 | Z3 |
| M414V/M416Y | −3.7 | −3.6 | Z8 |
| M414V/V399I | −3.0 | −3.3 | Z9 |
| M414V/M416Y/V399I | −3.8 | −4.5 | Z10 |

The designed mutations of Lck and corresponding calculated binding free energy change ($\Delta\Delta G_{bind,sum}$) for the binding of Gefitinib or Erlotinib (Table 3) to Lck are shown.

TABLE 3

| Mutation in human Lck | $\Delta\Delta G$ (kcal/mol) Erlotinib | $\Delta\Delta G_{bind,sum}$ (kcal/mol) Gefitinib | Compound |
|---|---|---|---|
| None (Wild-Type) | 0.0 | 0.0 | LWT |
| T316V | −5.0 | −5.1 | L7 |
| Y318L | −3.6 | −0.9 | L2 |
| S323C | −1.5 | +0.2 | LI |

This supports that a method of the invention allows designing sequence modification in a target kinase and predicting a binding strength of mutated kinase such as Zap-70 or Lck to specific kinase inhibitors.

Example 3: Expression of Kinase Mutants in T Cells

The expression profile of kinase mutants in T cells can be tested as follows, in particular Zap-70 mutants were tested to assess the expression of those mutants in this cell type.

Cell Line

The P116 T cell line deficient for Syk and Zap-70 was purchased from ATCC (Manassas, Virginia) and were maintained in complete media (Roswell Park Memorial Institute (RPMI)-1640 medium supplemented with 10% heat-inactivated fetal bovine serum and penicillin-streptomycin, all from Gibco, Invitrogen).

Lentivirus Production and Cell Transduction Efficiency

Full-length codon optimized DNA encoding the Zap-70 mutants were cloned in the pRRL third generation lentiviral vector (Dull et al., 1998, *J. Virol.,* 72: 8463-8471). Lentiviral vectors were produced by transient transfection of 293T cells using a standardized protocol for Lipofectamine 3000 (ThermoFisher Scientific). The P116 cells were transduced with fresh lentiviral supernatant and expression of the introduced Zap-70 mutants measured 2 weeks later, after antibiotic selection, by Western Blot.

Western Blotting

Transduction efficiency was determined from the lysates of transduced-P116 cells. Western blots were revealed with Zap-70 (Cell Signaling Technology) in 5% BSA-TBS (overnight at 4° C.) followed by polyclonal goat anti-rabbit horseradish peroxidase-labeled antibody (Cell Signaling Technology) for 1.5 h at room temperature, or with β-actin antibody (Santa Cruz) followed by polyclonal goat anti-mouse horseradish peroxidase-labeled antibody (Jackson ImmunoResearch). Membranes were revealed by chemiluminescence using the Fusion imaging system (Witec AG).

The expression of different Zap-70 mutants of the invention was assessed by Western Blot analysis on cell protein lysates after at least 2 weeks of culture in antibiotic selection condition to eliminate non-transduced cells. For Z1, Z2, Z3, Z8, Z9 and Z10 mutants, the expression was comparable to the WT form (FIG. 1). These results show that Zap-70 mutants can be expressed in T cells at the level of wild type Zap-70 kinase.

Example 4: T Cells Expressing Mutants of the Invention Produce IL-2

To assess the functionality of the T cells expressing mutants of the invention can be assessed through their ability of production of IL-2. The functionality of the T cells producing the Zap-70 mutants of the invention was tested in a cell-based assay as follows.

The used cell line, lentivirus production and cell transduction were as described in example 3.

Cell-Based Assays $10^5$ transduced P116 cells in microtiter plates coated were stimulated with S µg/ml anti-CD3 antibodies (OKT3) and stimulated with soluble anti-CD28 (CD28.2) mAbs for 24 h and 48 h at 37° C. and 5% $CO_2$ in complete medium. IL-2 secretion was evaluated in the supernatant with the Max Set Deluxe Human IL-2 Elisa Kit (Biolegend) and measurement of the optical density (OD) at 450 nm.

Figure 2:
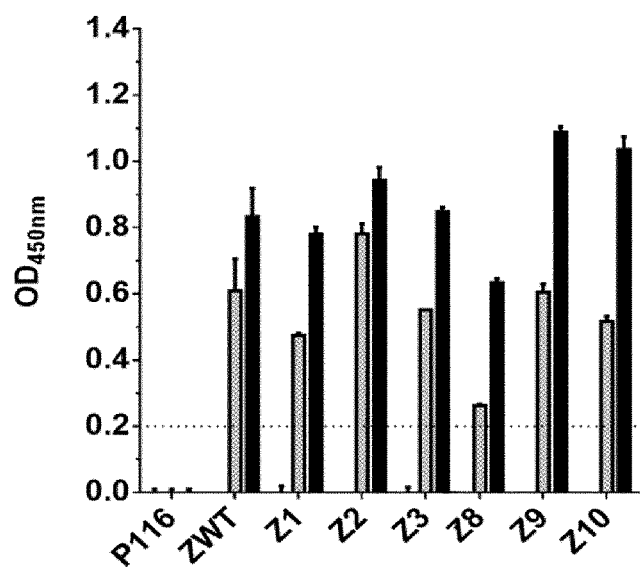
FIG. 2 shows IL-2 secretion after 24 h (grey bars) and 48 h (black bars) activation of Zap-70 mutants or Zap-70 wild-type (ZWT) transduced P116 cells, with anti-C3 and anti-CD8 antibodies and control (white bars), as described in Example 4.

The WT form of Zap-70 is able to restore IL-2 secretion after antibody stimulation while non-transduced P116 cells are not able to produce IL-2 upon activation (FIG. 2). For mutants of the invention Z1 to Z3 and Z8 to Z10, IL-2 production was comparable to the WT form of Zap-70 (FIG. 2).

These results demonstrate that expression of Zap-70 mutants of the invention in T cells deficient for Syk and Zap-70 can restore the T cell function of production of IL-2 and do not affect cells physiological responses.

Example 5: Specific Sensitivity to Inhibitory Agents, in Particular Tyrosine Kinase Inhibitors of T Cells Expressing Mutants In order to determine the sensitivity to inhibitory agents, in particular kinase inhibitors of T cells expressing kinase mutants of the invention, the cell viability of those T cells and their ability of production of IL-2 can be investigated in the presence of the specific kinase inhibitor for which the mutant has been reprogrammed as compared to those properties in absence of specific kinase inhibitor or in presence of a different kinase inhibitor. The sensitivity of T cells expressing Zap-70 mutants kinase of the invention were tested as follows.

The used cell line, lentivirus production and cell transduction were as described in example 3 and the cell-based assays used are those described in Example 4. The sensitivity of the Zap-70 mutants was investigated not only for the tyrosine kinase inhibitors (TKIs) for which those mutants were designed, Vandetanib and Erlotinib but also for other available ligands as listed in Table 4.

TABLE 4

| TKI | Formula | Known Foreign Kinase Targets |
|---|---|---|
| Afatinib | $C_{24}H_{25}ClFN_5O_3$ | EGFR, ErbB2 |
| CO-1686 | $C_{27}H_{28}F_3N_7O_3$ | EGFR |
| Crizotinib | $C_{21}H_{23}Cl_3FN_5O$ | ALK c-Met, HGFR EML Ros1 |
| Erlotinib | $C_{22}H_{24}ClN_3O_4$ | EGFR |
| Lapatinib | $C_{29}H_{26}ClFN_4O_4S$ | EGFR, ErbB2 |
| Neratinib | $C_{30}H_{29}ClN_6O_3$ | EGFR, ErbB2 |
| Vandetanib | $C_{22}H_{24}BrFN4O_2$ | EGFR, VEGFR, RET-tyrosine kinase |

Cell Viability

Figure 3:
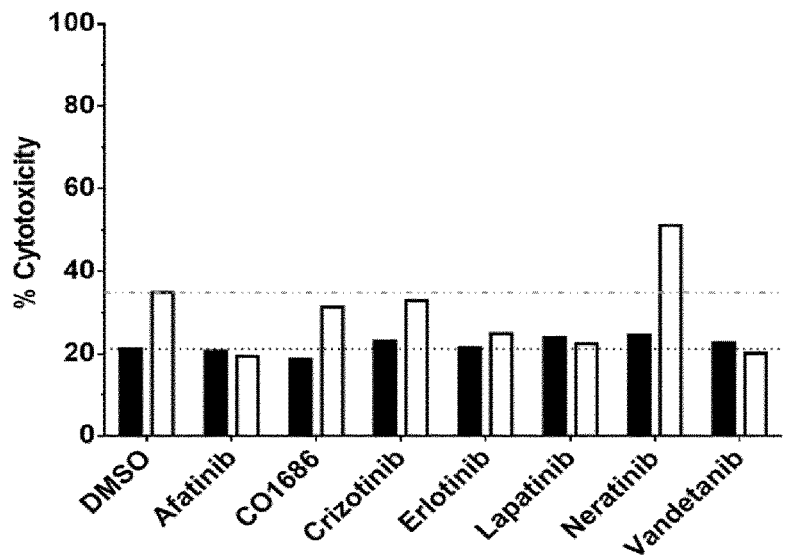
FIG. 3 shows percentage of WT Zap-70 transduced P116 dead cells after 24 h of antibody activation in presence of the Tyrosine Kinase Inhibitors (TKIs) at 2 concentrations (black bars: 500 nM; white bars; and 2.5 µM) or DMSO (control) as described in Example 5.

Following DMSO (negative control) or treatments with a kinase inhibitor, apoptotic cells were detected by 4',6-diamidino-2-phenylindole (DAPI) staining, which allowed identification of apoptotic nuclear change by fluorocytometry. Briefly, after 24 h of incubation cells were washed with PBS, re-suspended in PBS with 1 µg/mL DAPI and immediately analyzed using a BD LSR II cytometer. A 405 nm laser with 450150 nm bandpass filter was used to collect data. The inhibition of activation by TKIs was assessed by measuring their effect on cell viability (Table 5). After stimulation of WT Zap-70 transduced P116 cells, in presence or not of TKI, no cytotoxicity was observed for tested TKIs at 500 nM concentrations, only Neratinib induced cytotoxicity at 2.5 µM (FIG. 3).

Figure 4:
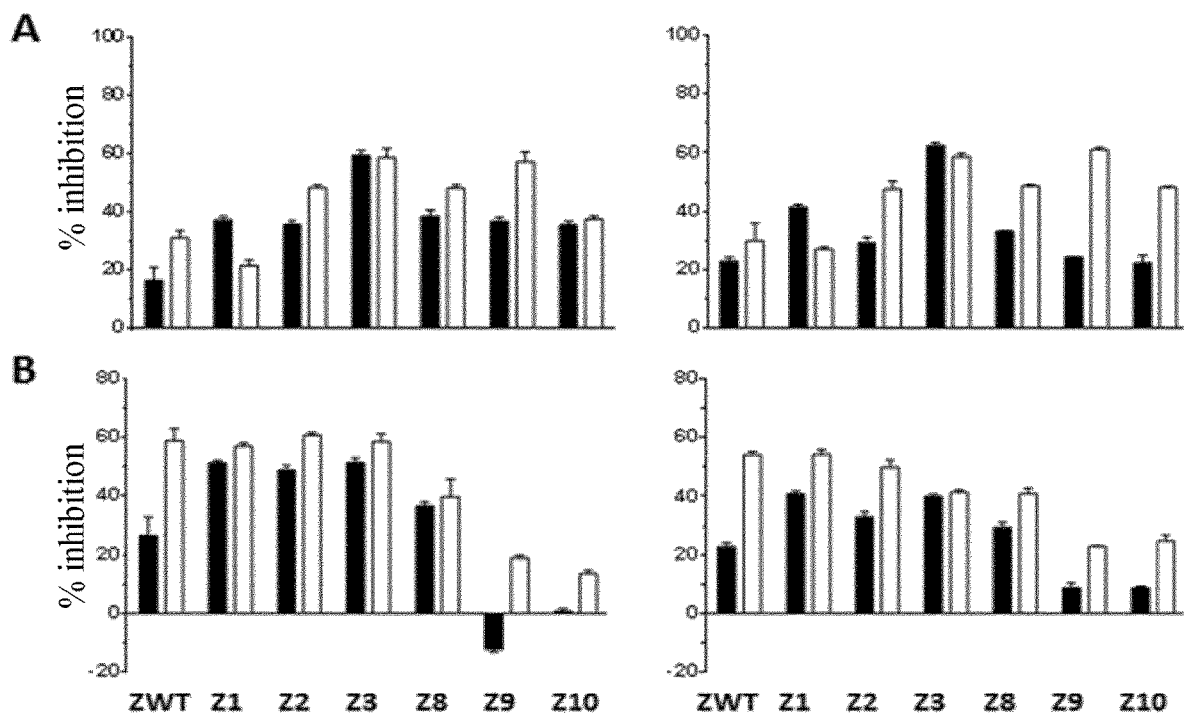
FIG. 4 shows percentage of inhibition of TKI compared to the control (DMSO) after 24 h (left panel) and 48 h (right panel) of culture upon stimulation with anti-CD3 and anti-CD28 antibodies as described in Example 5. A: Afatinib at 500 nM and 1 µM; B: CO-1686 at 500 nM and 1 µM; C: Crizotinib at 500 nM and 2.5 µM; D: Erlotinib at 500 nM and 2.5 µM; E: Lapatinib at 500 nM and 2.5 µM; F: Neratinib at 500 nM and 1 µM and G: Vandetanib at 500 nM and 1 µM; (black bars: 500 nM and white bars: 2.5 or 1 µM).
Figure 4:
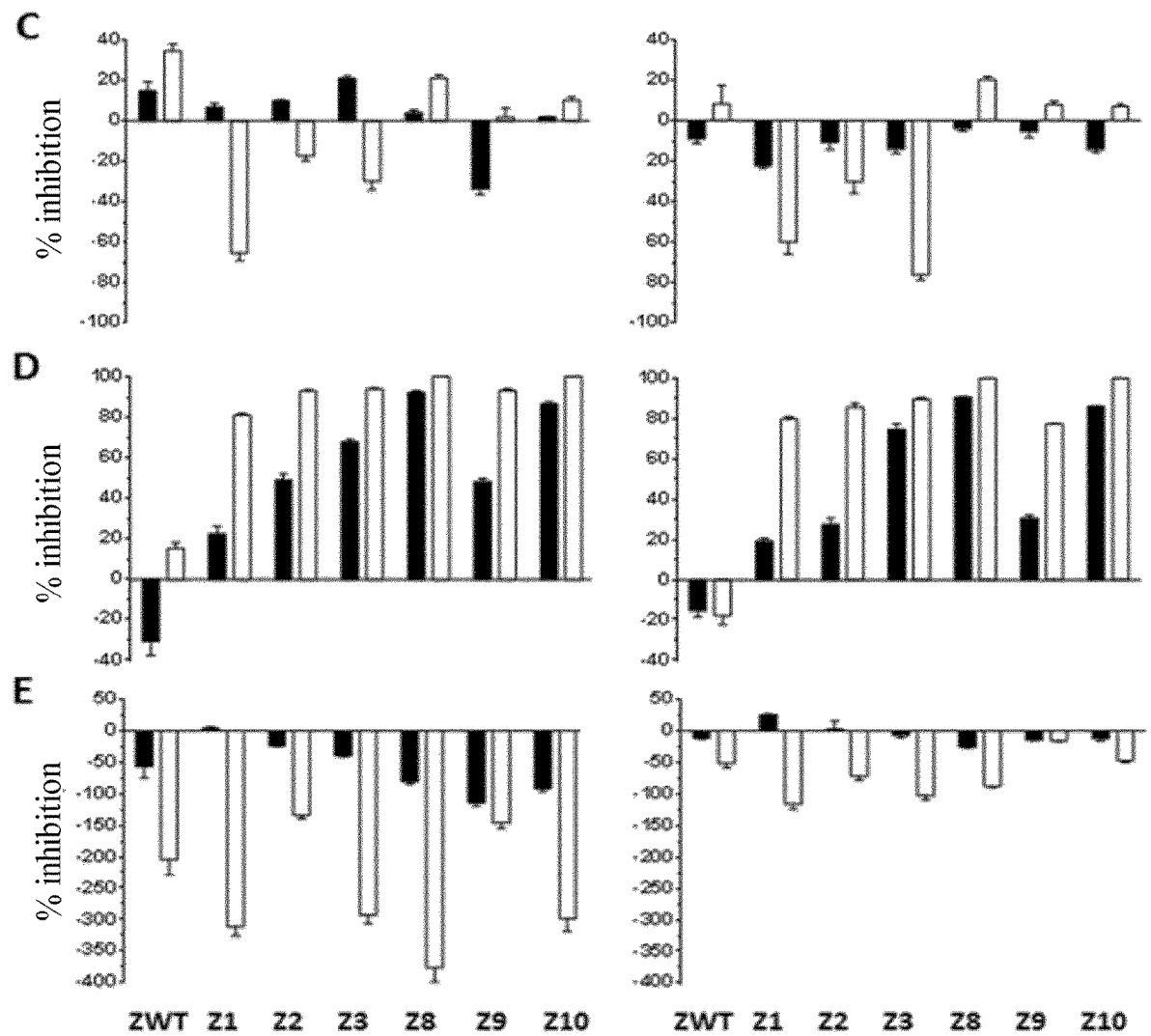
Figure 4:
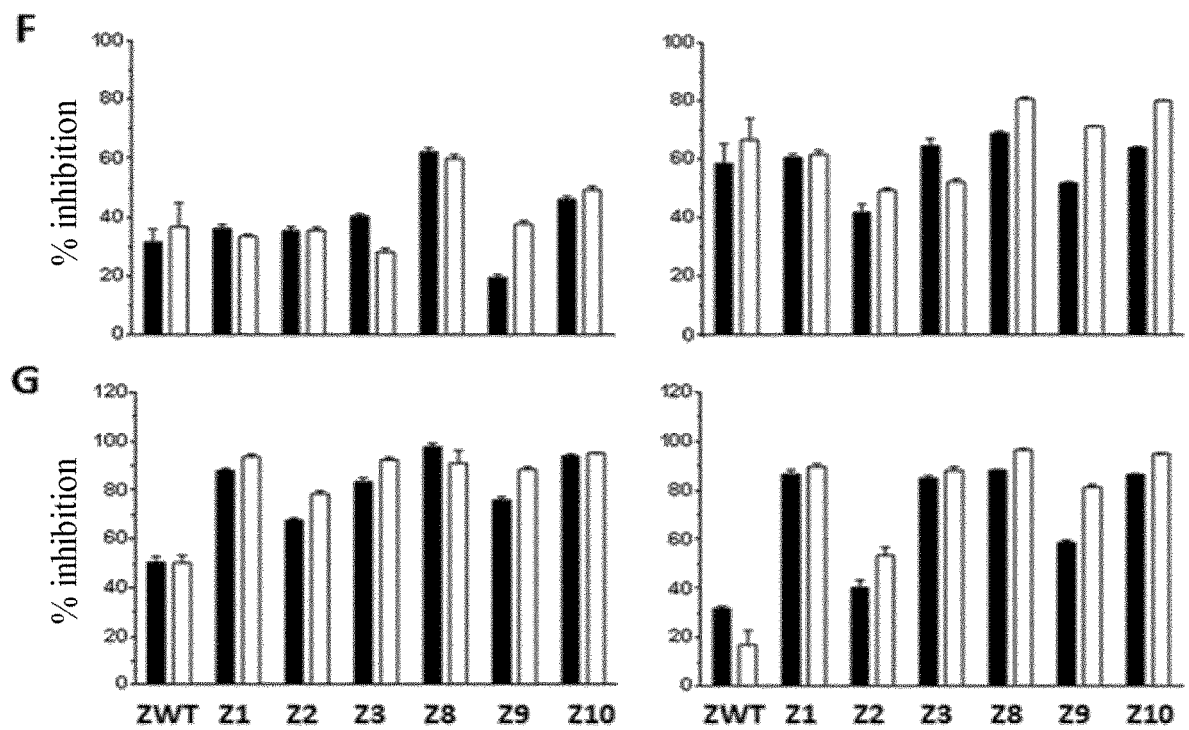
Figure 5:
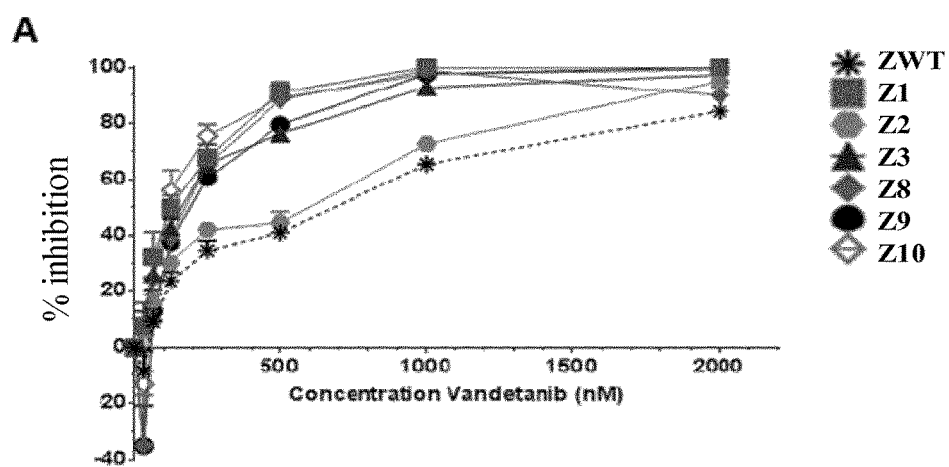
FIG. 5 shows dose-response curves of inhibition induced by Vandetanib (A, B) and Erlotinib (C, D) at 24 h (A, C) and 48 h (B, D) in P116 cells expressing wild Zap-70 type (ZWT) and mutants Z1, Z2, Z3, Z8, Z9 or Z10, after antibody stimulation (n=4) as described in Example 5.
Figure 5:
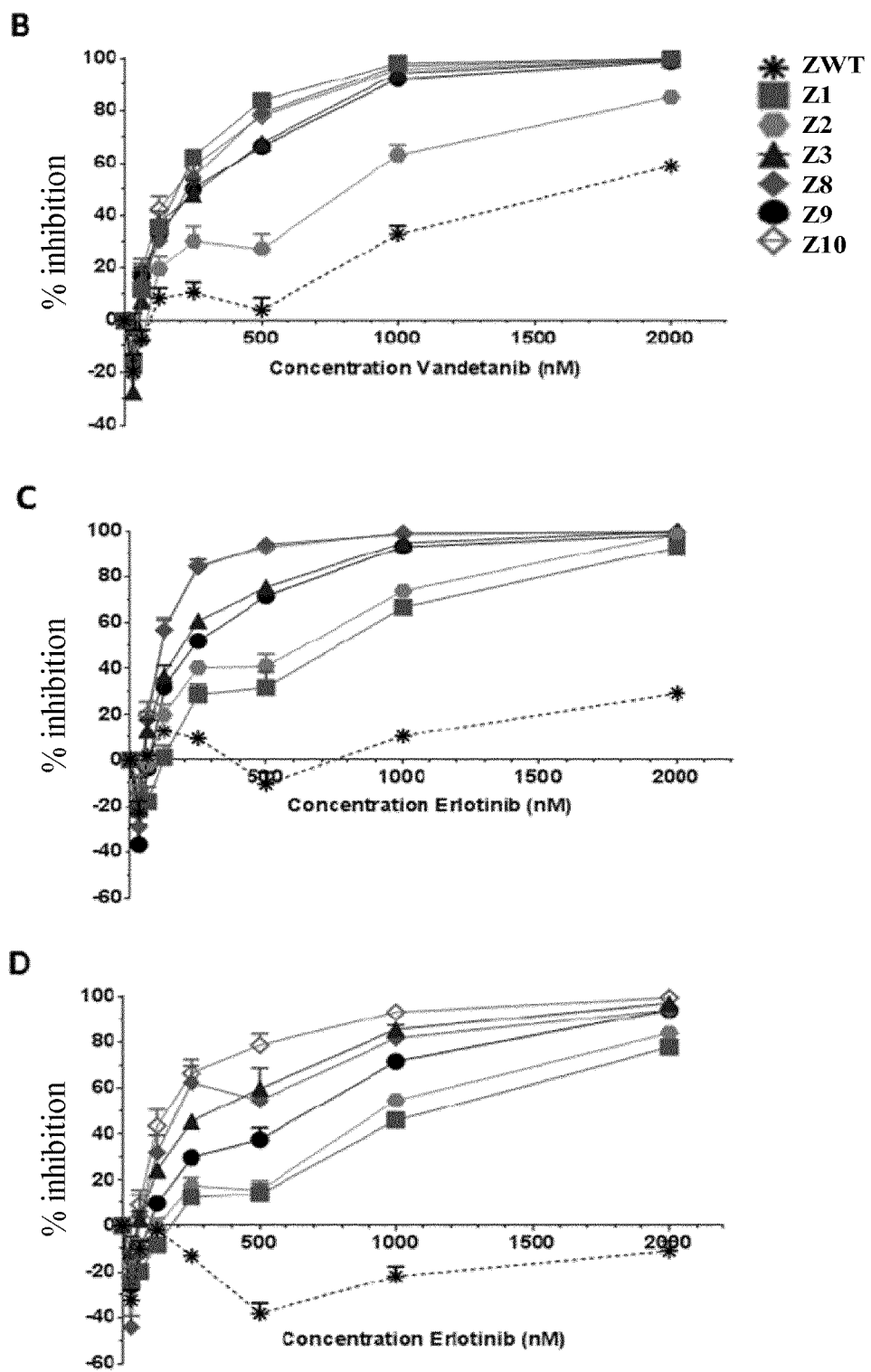

For the assessment of TKI, two concentrations of TKIs were used 500 nM and 1 or 2.5 µM. No significantly different inhibition in production of IL-2 was obtained with Afatinib, CO-1686 and Neratinib compared to the Zap-70 WT mutant (FIG. 4A, 4B, 4F), whereas Crizotinib and Lapatinib induced an increase of cell response (FIG. 4C, 4E). The inhibition was higher in mutants than WT with Erlotinib and Vandetanib (FIG. 4D, 4G) supporting the specific sensitivity of the mutants for the inhibitors for which they were designed by a method of the invention. The dose-response of these two inhibitors, i.e. Erlotinib and Vandetanib, clearly showed that mutants of Zap-70 of the invention are more sensitive to their inhibition than the WT Zap-70 (FIG. 5), where Z1 and Z10 are the most sensitive mutants to Vandetanib and Z8 and Z10 to Erlotinib (FIG. 5 and Table 5). This is in line with the favorable modeled interactions between these ligands and the mutated residues in Z1 and Z10 for Vandetanib and Z8 and Z10 for Erlotinib. This is also in agreement with the calculated binding free energy changes Table 2).

TABLE 5

| | $IC_{50}$ (nM) with Vandetanib | | $IC_{50}$ (nM) with Erlotinib | |
|---|---|---|---|---|
| | 24 h | 48 h | 24 h | 48 h |
| ZWT | 665 | 1660 | >2000 | >2000 |
| Mutants | | | | |
| Z1 | 125 | 195 | 775 | 1130 |
| Z2 | 600 | 820 | 640 | 940 |
| Z3 | 165 | 280 | 195 | 335 |
| Z8 | 180 | 230 | 110 | 200 |
| Z9 | 195 | 250 | 230 | 690 |
| Z10 | 110 | 180 | 110 | 170 |

For Z1 and Z10 mutants, there was a 5-6 fold decrease in $IC_{50}$ of Vandetanib at 24 h (ZWT: 665 nM, Z1: 125 nM, Z10: 110 nM) and a 10-fold decrease at 48 h (ZWT: 1660 nM, Z1: 195 nM, Z10: 180 nM), as compared to the WT Zap-70 condition. For Z8 and Z10 mutants, there was more than 18 fold decrease in $IC_{50}$ of Erlotinib at 24 h (ZWT: >2000 nM, Z8: 110 nM, Z10: 110 nM) and a 10 fold decrease at 48 h (ZWT: >2000 nM, Z8: 200 nM, Z10: 170 nM), as compared to the WT Zap-70 condition.

These results demonstrate that mutated Zap-70 kinases of the invention can be efficiently inhibited by specific TKI and that the inhibitory response of mutated Zap-70 kinases to TKI is increased as compared to wild type Zap-70.

Example 6: Binding of Lck Mutants to Gefitinib

The ability of Lck mutants to bind to the tyrosine kinase inhibitor (TKIs) for which those mutants were designed i.e., gefitinib was assessed as follows (Table 6):

TABLE 6

| Mutation in human Lck | Compound |
|---|---|
| None (Wild-Type) | LWT |
| S323C | L1 |
| S323C + Y318L | L4 |

The Lck mutants were produced and purified and used in a functional test as described below.

Cell Transfection and Protein Production

Full-length, codon-optimized DNAs encoding the Lck mutants, tagged with a c-Myc-tag (a polypeptide protein tag derived from the c-myc gene) at their N-terminal site, were cloned in an EBV (EBV promoter) promoter-based episome vector. Lck mutants were produced by transfection of 293T cells using a standardized protocol for Lipofectamine® 3000 (ThermoFisher Scientific). Expression of the introduced LcK mutants is measured by Western blot analysis.

Western Blot Analysis

Western blots are performed on the lysates of transfected-293T cells. Lck (c-myc tag labeled) was detected by anti-c-Myc antibody (clone 9E10) in 5% Milk-TBS (overnight at 4° C.) followed by polyclonal goat anti-mouse horseradish peroxidase-labeled antibody (Jackson ImmunoResearch) for 1.5 h at room temperature. As a control, O-actin was measured with an anti-f-actin antibody (Santa Cruz) followed by polyclonal goat anti-mouse horseradish peroxidase-labeled antibody (Jackson ImmunoResearch). Membranes are revealed by chemiluminescence using the Fusion imaging system (Witec AG).

Purification of Lck Mutants

Lck mutant purification was performed with µMACS c-myc Isolation Kit (Miltenyi Biotech), according to the manufacturer's instructions. Briefly, after lysis of the transfected 293T cells, c-myc-tagged Lck proteins were captured with µMACS magnetic anti-c-myc MicroBeads. The sample was loaded onto a MACS Column placed in the magnetic field of a µMACS separator in which the magnetically labeled c-myc-tagged and associated proteins are retained during the washing steps. The Lck proteins associated with anti-c-myc MicroBeads were eluted by removing the µColumn from µMacs Separator and adding elution buffer (50 mM Tris-HCl, pH 7.5, 150 mM NaCl, 0.25 mM DTT (dithiothreitol), 0.1 mM PMSF (phenylmethylsulfonyl fluoride), 10% glycerol, Halt protease inhibitory cocktail (ThermoFischer Scientific) and phosphatase inhibitory cocktail (Cell Signaling Technology)).

Functional Testing of Lck Mutants

The activity of Lck mutants as compared to wild-type Lck (LWT) was determined with the LCK Kinase Enzyme System (ADP-Glo™ Kinase Assay Family) from Promega, according to the manufacturer's instructions. Briefly, LWT and Lck mutants, in presence or not of increasing concentration of gefitinib, were incubated with substrate (ATP). After the kinase reaction, an equal volume of ADP-Glo™ Reagent was added to terminate the kinase reaction and deplete the remaining ATP. In the second step, the Kinase Detection Reagent was added, which simultaneously converts ADP to ATP and allows the newly synthesized ATP to be measured using a coupled luciferase/luciferin reaction. The luminescence was acquired on a SpectraMax Plus Microplate Reader (Molecular Devices). The percentages of inhibition and $IC_{50}$ of Lck mutants and LWT by gefitinib were derived therefrom. The experiment was performed 3 times and the result of trial 1, 2 and 3 as well as the pooled results (n=3) are shown in Table 7.

TABLE 7

| | $IC_{50}$ (nM) Gefitinib | | | |
| --- | --- | --- | --- | --- |
| | trial 1 | trail 2 | trial 3 | n = 3 |
| LWT | >4000 | 7400 | 7900 | 7600 |
| Mutants | | | | |
| L1 | 2600 | 3200 | 3600 | 3200 |
| L4 | >4000 | 6200 | 8000 | 6900 |

Figure 6:
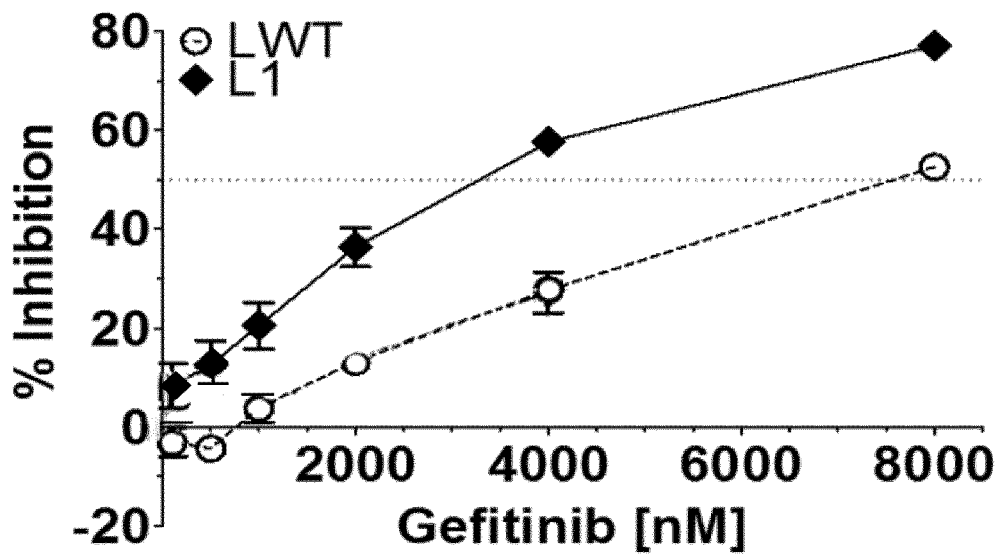
FIG. 6 shows dose-response curves of inhibition induced by Gefitinib on Lck type (LWT) and mutants L1 (A) or L4 (B) (n=3) as described in Example 6.
Figure 6:
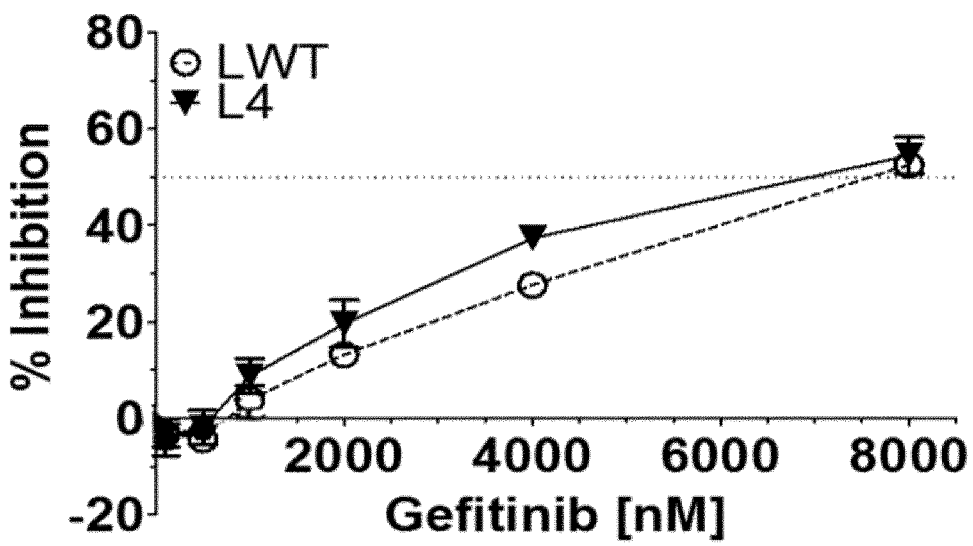

The dose-response of gefitinib, clearly showed that Lck mutants of the invention L1 and L4 are more sensitive than WT Lck, (FIG. 6). These results demonstrate that mutated Lck kinases of the invention can be efficiently inhibited by a specific TKI and that the inhibitory response of mutated Lck kinases to TKI is increased as compared to wild type Lck.

```
Sequence listing
Amino acid sequence of human Zap-70
SEQ ID NO: 1:
mpdpaahlpffygsisraeaeehlklagmadglfllrqclrslggyvlslvhdvrfhhfpierqlngt yaiaggkahcgpaelcefysrdpdglpcnlrkpcnrpsglepqpgvfdclrdamvrdyvrqtwklege alegaiisqapqvekliattahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkqidvaikvlkqgtekadteemmreaqimhqldnpyivrligvcqae almlvmemagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltveqrmracyyslaskvegppgstq kaeaaca Amino acid sequence of human Lck
SEQ ID NO: 2:
mgcgcsshpeddwmenidvcenchypivpldgkgtllirngsevrdplvtyegsnppasplqdnlvia lhsyepshdgdlgfekgeqlrileqsgewwkagslttggegfipfnfvakanslepepwffknlsrkd aerqllapgnthgsfliresestagsfslsvrdfdqnqgevvkhykirnldnggfyispritfpglhe lvrhytnasdglctrlsrpcqtqkpqkpwwedewevpretlklverlgagqfgevwmgyynghtkvav
```

-continued kslkqgsmspdaflaeanlmkqlqhqrlvrlyavvtqepiyiiteymengslvdflktpsgikltink lldmaagiaegmafieernyihrdlraanilvsdtlsckiadfglarliednewytaregakfpikwta peainygtftiksdvwsfgillteivthgripypgmtnpeviqnlergyrmvrpdnopeelyqlmrlc wkerpedrptfdylrsvledffftategqyqpqp Amino acid sequence of Z1 (mutated human Zap-70)
SEQ ID NO: 3:
mpdpaahlpffygsisraeaeehlklagmadglfllrgclrslggyvlslvhdvrfhhfpierqlngt yaiaggkahcgpaelcefysrdpdglpcnlrkpcnrpsglepqpgvfdclrdamvrdyvrqtwklege alegaiisqapqvekliattahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgognfgsvrqgvyrmrkkgidvaikvlkqgtekadteemmreaqimhqldnpyivrligvcqae almlvaemagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdflltveqrmracyyslaskvegppgstq kaeaaca Amino acid sequence of Z2 (mutated human Zap-70)
SEQ ID NO: 4:
mpdpaahlpffygsisraeaeehlklagmadglfllrgclrslggyvlslvhdvrfhhfpierqlngt yaiaggkahogpaelcefysrdpdglpcnlrkpcnrpsglepqpgvfdclrdamvrdyvrqtwklege alegaiisqapqvekliattahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkqidvaikvlkqgtekadteemmreaqimhqldnpyivrligvcqae almlvtemagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltvegrmracyyslaskvegppgstq kaeaaca Amino acid sequence of Z3 (mutated human Zap-70)
SEQ ID NO: 5:
mpdpaahlpffygsisraeaeehlklagmadglfllrqclrslggyvlslvhdvrfhhfpierqlngt yaiaggkahcgpaelcefysrdpdglpcnlrkpcnrpsglepqpgvfdclrdamvrdyvrqtwklege aleqaiisqapqvekliattahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkgidvaikvlkqgtekadteemmreaqimhqldnpyivrligvcqae almlvvemagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltvegrmracyyslaskvegppgstq kaeaaca Amino acid sequence of Z8 (mutated human Zap-70)
SEQ ID NO: 6:
mpdpaahlpffygsisraeaeehlklagmadglfllrqclrslggyvlslvhdvrfhhfpierqlngt yaiaggkahcgpaelcefysrdpdglpcnlrkpcnrpsglepqpgvfdclrdamvrdyvrqtwklege aleqaiisqapqvekliattahermpwyhssltreeaerklysgaqtdgkfllrprkeqgtyalsliy -continued gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkgidvaikvlkqgtekadteemmreaqimhqldnpyivrligvcqae almlvveyagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltveqrmracyyslaskvegppgstq kaeaaca Amino acid sequence of Z9 (mutated human Zap-70)
SEQ ID NO: 7:
mpdpaahlpffygsisraeaeehlklagmadglfllrqclrslggyvlslvhdvrfhhfpierqlngt yaiaggkahcgpaelcefysrdpdglpcnlrkpcnrpsglepqpgvfdclrdamvrdyvrqtwklege alegaiisqapqvekliattahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkqidvaikvlkqgtekadteemmreaqimhqldnpyiirligvcqae almlvvemagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltveqrmracyyslaskvegppgstq kaeaaca Amino acid sequence of Z10 (mutated human Zap-70)
SEQ ID NO: 8:
mpdpaahlpffygsisraeaeehlklagmadglfllrqclrslggyvlslvhdvrfhhfpierqlngt yaiaggkahcgpaelcefysrdpdglpcnlrkpcnrpsglepqpgvfdclrdamvrdyvrqtwklege alegaiisqapqveklittahermpwyhssltreeaerklysgaqtdgkfllrprkeqgtyalsliy gktvyhylisqdkagkycipegtkfdtlwqlveylklkadgliyclkeacpnssasnasgaaaptlpa hpstlthpqrridtlnsdgytpeparitspdkprpmpmdtsvyespysdpeelkdkklflkrdnllia dielgcgnfgsvrqgvyrmrkkgidvaikvlkqgtekadteemmreaqimhqldnpyiirligvcqae almlvvveyagggplhkflvgkreeipvsnvaellhqvsmgmkyleeknfvhrdlaarnvllvnrhyak isdfglskalgaddsyytarsagkwplkwyapecinfrkfssrsdvwsygvtmwealsygqkpykkmk gpevmafieqgkrmecppecppelyalmsdcwiykwedrpdfltvegrmracyyslaskvegppgstq kaeaaca Amino acid sequence of mutated human Lck 7 (T316V)
SEQ ID NO: 9:
mgcgcsshpeddwmenidvcenchypivpldgkgtllirngsevrdplvtyegsnppasplqdnlvia lhsyepshdgdlgfekgeqlrilegsgewwkaqslttggegfipfnfvakanslepepwffknlsrkd aerqllapgnthgsfliresestagsfslsvrdfdqnqgevvkhykirnldnggfyispritfpglhe lvrhytnasdglctrlsrpcgtqkpqkpwwedewevpretlklverlgaggfgevwmgyynghtkvav kslkqgsmspdaflaeanlmkqlqhqrlvrlyavvtqepiyiiveymengslvdflktpsgikltink lldmaaqiaegmafieernyihrdlraanilvsdtlsckiadfglarliedneytaregakfpikwta peainygtftiksdvwsfgillteivthgripypgmtnpeviqnlergyrmvrpdncpeelyqlmrlc wkerpedrptfdylrsvledffftategqyqpqp -continued Amino acid sequence of mutated human Lck 2 (Y318L)
SEQ ID NO: 10:
mgcgcsshpeddwmenidvcenchypivpldgkgtllirngsevrdplvtyegsnppasplqdnlvia lhsyepshdgdlgfekgeqlrileqsgewwkaqslttgqegfipfnfvakanslepepwffknlsrkd aerqllapgnthgsfliresestagsfslsvrdfdqnqgevvkhykirnldnggfyispritfpglhe lvrhytnasdglctrlsrpcqtqkpqkpwwedewevpretlklverlgagqfgevwmgyynghtkvav kslkqgsmspdaflaeanlmkqlqhqrlvrlyavvtgepiyiitelmengslvdflktpsgikltink lldmaaqiaegmafieernyihrdlraanilvsdtlsckiadfglarliedneytaregakfpikwta peainygtftiksdvwsfgillteivthgripypgmtnpeviqnlergyrmvrpdncpeelyqlmrlc wkerpedrptfdylrsvledffftategqyqpqp Amino acid sequence of mutated human Lck 1 (S323C)
SEQ ID NO: 11:
mgcgcsshpeddwmenidvcenchypivpldkgtllirngsevrdplvtyegsnppasplqdnlvia lhsyepshdgdlgfekgeqlrileqsgewwkaqslttgqegfipfnfvakanslepepwffknlsrkd aerqllapgnthgsfliresestagsfslsvrdfdqnqgevvkhykirnldnggfyispritfpglhe lvrhytnasdglctrlsrpcqtqkpqkpwwedewevpretlklverlgagqfgevwmgyynghtkvav kslkqgsmspdaflaeanlmkqlqhqrlvrlyavvtqepiyiiteymengclvdflktpsgikltink lldmaaqiaegmafieernyihrdlraanilvsdtlsckiadfglarliedneytaregakfpikwta peainygtftiksdvwsfgillteivthgripypgmtnpeviqnlergyrmvrpdncpeelyqlmrlc wkerpedrptfdylrsvledfftategqyqpqp Amino acid sequence part of mutated Zap-70 (consensus)
SEQ ID NO: 12:
Xaa1 Xaa2 Xaa3 Xaa4 Xaa5 Xaa6 Xaa7 Xaa8 Xaa9 Xaa10 Xaa11 Xaa12 Xaa13

Xaa14 Xaa15 Xaa16 Xaa17 Xaa18 Xaa19 Xaa20 Xaa21 Xaa22 Xaa23 Xaa24

Xaa25 Xaa26
wherein

Xaa1 is selected from V and I;

Xaa2 is selected from R, K, and H;

Xaa3 is selected from L, I, V, M, A, F and Y;

Xaa4 is selected from I, L, V, M, A, F and Y;

Xaa5 is selected from G, P and A;

Xaa6 is selected from V, I, M, L, F, A and P;

Xaa7 is selected from C, S, T and A;

Xaa8 is selected from Q and N;

Xaa9 is selected from A, V, L, I and P;

Xaa10 is selected from E and D;

Xaa11 is selected from A, V, L, I and P;

Xaa12 is selected from L, I, V, M, A, F and Y;

Xaa13 is selected from M, V, L, I and F;

Xaa14 is selected from L, I, V, M, A, F and Y;

Xaa15 is selected from V, I, M, L, F, A and P;

Xaa16 is selected from M, A, V and T;

Xaa17 is selected from E and D;

Xaa18 is selected from M, Y and L;

-continued

Xaa19 is selected from A, V, L, I and P;

Xaa20 is selected from G, P and A;

Xaa21 is selected from G, P and A;

Xaa22 is selected from G, P and A;

Xaa23 is selected from P, A and G;

Xaa24 is selected from L, I, V, M, A, F and Y;

Xaa25 is selected from H, K and R;

Xaa26 is selected from K, R and H; wherein SEQ ID NO: 12 is a mutated sequence of a fragment of SEQ ID NO: 1 from position 399 to 424 and therefore not identical to SEQ ID NO: 1.

Amino acid sequence part of mutated Lck (consensus)
SEQ ID NO: 13:
Xab1 Xab2 Xab3 Xab4 Xab5 Xab6 Xab7 Xab8 Xab9 (SEQ ID NO: 13)
wherein Xab1 is selected from T, V and S;

Xab2 is selected from E and D;

Xab3 is selected from Y and L;

Xab4 is selected from M, V, L, I and F;

Xab5 is selected from E and D;

Xab6 is selected from N and Q;

Xab7 is selected from G, P and A;

Xab8 is selected from S, C, T and A;

Xab9 is selected from L, I, V, M, A, F and Y;
wherein SEQ ID NO: 13 is a mutated sequence of a fragment of SEQ ID NO: 2 from position 316 to 324 and therefore not identical to SEQ ID NO: 2.

Nucleic acid sequence of Z1 (5'-3'; mutated human Zap-70)
SEQ ID NO: 14:
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

```
AGGCCCAGATCATGCACCAGCTGGACAACCCCTACATCGTGCGGCTGATCGGCGTGTGTCAGGCCGAA

GCTCTGATGCTCGTGGCCGAAATGGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT
```
Nucleic acid sequence of Z2 (5'-3'; mutated human Zap-70)
SEQ ID NO: 15:
```
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

AGGCCCAGATCATGCACCAGCTGGACAACCCCTACATCGTGCGGCTGATCGGCGTGTGTCAGGCCGAA

GCTCTGATGCTCGTGACCGAAATGGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT
```

Nucleic acid sequence of Z3 (5'-3'; mutated human Zap-70)
SEQ ID NO: 16:
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

AGGCCCAGATCATGCACCAGCTGGACAACCCCTACATCGTGCGGCTGATCGGCGTGTGTCAGGCCGAA

GCTCTGATGCTCGTGGTCGAAATGGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT

Nucleic acid sequence of Z8 (5'-3'; mutated human Zap-70)
SEQ ID NO: 17:
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

-continued

```
CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

AGGCCCAGATCATGCACCAGCTGGACAACCCCTACATCGTGCGGCTGATCGGCGTGTGTCAGGCCGAA

GCTCTGATGCTCGTGGTCGAATACGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT

Nucleic acid sequence of Z9 (5'-3'; mutated human Zap-70)
SEQ ID NO: 18:
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGCGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

AGGCCCAGATCATGCACCAGCTGGACAACCCCTACATCATTCGGCTGATCGGCGTGTGTCAGGCCGAA

GCTCTGATGCTCGTGGTCGAAATGGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG
```

-continued

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT

Nucleic acid sequence of Z10 (5'-3'; mutated human Zap-70)
SEQ ID NO: 19:
ATGCCTGATCCTGCCGCCCATCTGCCATTCTTCTACGGCAGCATCAGCAGAGCCGAGGCCGAGGAACA

CCTGAAGCTGGCCGGAATGGCCGACGGCCTGTTCCTGCTGAGACAGTGCCTGAGAAGCCTGGGCGGCT

ACGTGCTGAGCCTGGTGCACGATGTGCGGTTCCACCACTTCCCCATCGAGCGGCAGCTGAACGGCACC

TACGCTATCGCTGGCGGCAAGGCCCATTGTGGACCTGCCGAGCTGTGCGAGTTCTACAGCAGAGATCC

CGATGGCCTGCCCTGCAACCTGCGGAAGCCCTGCAATAGACCCAGCGGCCTGGAACCTCAGCCCGGCG

TGTTCGACTGTCTGAGGGATGCCATGGTGCGCGACTACGTGCGGCAGACCTGGAAGCTGGAAGGCGAG

GCTCTGGAACAGGCTATCATCAGCCAGGCCCCCAGGTGGAAAAGCTGATCGCCACAACCGCCCACGA

GCGGATGCCCTGGTATCACAGCAGCCTGACCAGAGAGGAAGCCGAGCGGAAGCTGTACTCTGGCGCCC

AGACCGACGGCAAATTCCTGCTGCGGCCCAGAAAAGAGCAGGGCACATACGCCCTGAGCCTGATCTAC

GGCAAGACCGTGTACCACTACCTGATCTCCCAGGACAAGGCCGGCAAGTACTGCATCCCCGAGGGCAC

CAAGTTCGACACCCTGTGGCAGCTGGTGGAATATCTGAAGCTGAAGGCCGACGGACTGATCTACTGCC

TGAAAGAGGCCTGCCCCAACAGCAGCGCCAGCAATGCTAGCGGAGCCGCCGCTCCTACACTGCCTGCC

CATCCTAGCACCCTGACCCACCCCCAGAGAAGAATCGATACCCTGAATTCCGACGGCTACACCCCCGA

GCCTGCCAGAATCACCAGCCCCGACAAGCCCAGACCCATGCCCATGGACACCAGCGTGTACGAGAGCC

CCTACAGCGACCCCGAGGAACTGAAGGACAAGAAGCTGTTCCTGAAGCGGGACAACCTGCTGATTGCC

GACATCGAGCTGGGCTGCGGCAACTTTGGATCTGTGCGGCAGGGCGTGTACCGGATGCGGAAGAAACA

GATCGACGTGGCCATCAAGGTGCTGAAGCAGGGAACCGAGAAGGCCGATACCGAGGAAATGATGCGCG

AGGCCCAGATCATGCACCAGCTGGACAACCCCTACATCATTCGGCTGATCGGCGTGTGTCAGGCCGAA

GCTCTGATGCTCGTGGTCGAATACGCTGGCGGCGGACCCCTGCACAAGTTTCTCGTGGGCAAGCGGGA

AGAGATCCCCGTGTCCAATGTGGCCGAGCTGCTGCACCAGGTGTCAATGGGAATGAAGTACCTCGAGG

AGAAGAACTTCGTGCACCGGGACCTGGCCGCCAGAAACGTGCTGCTCGTGAACCGGCACTACGCCAAG

ATCAGCGACTTTGGCCTGAGCAAGGCCCTGGGCGCCGACGACAGCTACTACACAGCCAGATCCGCCGG

AAAGTGGCCCCTGAAGTGGTACGCCCCCGAGTGCATCAACTTCAGAAAGTTCAGCAGCCGCAGCGACG

TGTGGTCCTACGGCGTGACAATGTGGGAGGCCCTGAGCTACGGCCAGAAACCCTACAAGAAGATGAAG

GGCCCCGAAGTGATGGCCTTCATCGAGCAGGGAAAGCGGATGGAATGCCCCCCTGAGTGCCCTCCTGA

GCTGTATGCCCTGATGAGCGACTGCTGGATCTACAAGTGGGAGGACCGGCCCGACTTCCTGACCGTGG

AACAGAGAATGCGGGCCTGCTACTACAGCCTGGCCTCTAAGGTGGAAGGCCCTCCTGGCAGCACCCAG

AAAGCCGAAGCCGCCTGTGCT

Amino acid sequence of mutated human Lck 4 (S323C + Y318L)
SEQ ID NO: 20:
mgcgcsshpeddwmenidvcenchypivpldgkgtllirngsevrdplvtyegsnppasplqdnlvia lhsyepshdgdlgfekgeqlrileqsgewwkaqslttgqegfipfnfvakanslepepwffknlsrkd aerqllapgnthgsflireseestagsfslsvrdfdqnqgevvkhykirnldnggfyispritfpglhe lvrhytnasdglctrlsrpcqtqkpqkpwwedewevpretlklverlgagqfgevwmgyynghtkvav -continued kslkqgsmspdaflaeanlmkqlqhqrlvrlyavvtgepiyiitelmengclvdflktpsgikltink lldmaaqiaegmafieernyihrdlraanilvsdtlsckiadfglarliedneytaregakfpikwta peainygtftiksdvwsfgillteivthgripypgmtnpeviqnlergyrmvrpdnopeelyqlmrlc wkerpedrptfdylrsvledffttategqyqpqp

---

The invention claimed is:

1. An isolated nucleic acid molecule encoding a Zap-70 kinase mutant that retains functional activity of wild-type Zap-70 kinase and is more sensitive than wild-type Zap-70 kinase to inhibition by erlotinib and vandetanib, wherein the Zap-70 kinase mutant comprises an amino acid sequence of SEQ ID NO: 1 wherein is introduced at least one mutation selected from: V399L, M414A, M414T, M414V, M416Y, M416V, M416L, M416L, M416F, M416W, M416H, M416T, and M416S.

2. The isolated nucleic acid molecule of claim 1, wherein the Zap-70 kinase mutant comprises an amino acid sequence selected from SEQ ID NO: 5, SEQ ID NO: 6, SEQ ID NO: 7, and SEQ ID NO: 8.

3. The isolated nucleic acid molecule of claim 1, wherein the Zap-70 kinase mutant comprises an amino acid sequence of SEQ ID NO: 1, wherein is introduced the mutation M414A, and at least one conservative substitution of at least one amino acid on at least one position selected from 342, 344-346, 350-354, 367-369, 386, 390, 399, 412, 413, 415-421, 424, 466-468, and 478-480.

4. The isolated nucleic acid molecule of claim 1, wherein the Zap-70 kinase mutant further comprises at least one conservative substitution of at least one amino acid of the mutated SEQ ID NO: 1 on at least one position selected from 342, 344-346, 350-354, 367-369, 386, 390, 399, 412-421, 424, 466-468, and 478-480, which was not mutated.

5. A recombinant vector comprising the nucleic acid molecule of claim 1.

6. A pharmaceutical composition comprising the recombinant vector of claim 5 and at least one pharmaceutically acceptable carrier, diluent, or excipient.

7. An isolated cell comprising the nucleic acid molecule of claim 1.

8. The isolated cell of claim 7, wherein the cell is a T cell.

9. A pharmaceutical composition comprising the cell of claim 7 and at least one pharmaceutically acceptable carrier, diluent, or excipient.

10. An isolated nucleic acid molecule encoding a Zap-70 kinase mutant that retains functional activity of wild-type Zap-70 kinase and is more sensitive than wild-type Zap-70 kinase to inhibition by erlotinib and vandetanib, wherein the Zap-70 kinase mutant comprises an amino acid sequence selected from SEQ ID NO: 3, SEQ ID NO: 4, SEQ ID NO: 5, SEQ ID NO: 6, SEQ ID NO: 7, and SEQ ID NO: 8.

11. A recombinant vector comprising the nucleic acid molecule of claim 10.

12. A pharmaceutical composition comprising the recombinant vector of claim 11 and at least one pharmaceutically acceptable carrier, diluent, or excipient.

13. An isolated cell comprising the nucleic acid molecule of claim 10.

14. The isolated cell of claim 13, wherein the cell is a T cell.

15. A pharmaceutical composition comprising the cell of claim 13 and at least one pharmaceutically acceptable carrier, diluent, or excipient.

* * * * *

SEQUENCE LISTING

```
Sequence total quantity: 20
SEQ ID NO: 1              moltype = AA  length = 619
FEATURE                   Location/Qualifiers
source                    1..619
                          mol_type = protein
                          organism = Homo sapiens
SEQUENCE: 1
MPDPAAHLPF FYGSISRAEA EEHLKLAGMA DGLFLLRQCL RSLGGYVLSL VHDVRFHHFP    60
IERQLNGTYA IAGGKAHCGP AELCEFYSRD PDGLPCNLRK PCNRPSGLEP QPGVFDCLRD   120
AMVRDYVRQT WKLEGEALEQ AIISQAPQVE KLIATTAHER MPWYHSSLTR EEAERKLYSG   180
AQTDGKFLLR PRKEQGTYAL SLIYGKTVYH YLISQDKAGK YCIPEGTKFD TLWQLVEYLK   240
LKADGLIYCL KEACPNSSAS NASGAAAPTL PAHPSTLTHP QRRIDTLNSD GYTPEPARIT   300
SPDKPRPMPM DTSVYESPYS DPEELKDKKL FLKRDNLLIA DIELGCGNFG SVRQGVYRMR   360
KKQIDVAIKV LKQGTEKADT EEMMREAQIM HQLDNPYIVR LIGVCQAEAL MLVMEMAGGG   420
PLHKFLVGKR EEIPVSNVAE LLHQVSMGMK YLEEKNFVHR DLAARNVLLV NRHYAKISDF   480
GLSKALGADD SYYTARSAGK WPLKWYAPEC INFRKFSSRS DVWSYGVTMW EALSYGQKPY   540
KKMKGPEVMA FIEQGKRMEC PPECPPELYA LMSDCWIYKW EDRPDFLTVE QRMRACYYSL   600
ASKVEGPPGS TQKAEAACA                                                619

SEQ ID NO: 2              moltype = AA  length = 509
FEATURE                   Location/Qualifiers
source                    1..509
                          mol_type = protein
                          organism = Homo sapiens
SEQUENCE: 2
MGCGCSSHPE DDWMENIDVC ENCHYPIVPL DGKGTLLIRN GSEVRDPLVT YEGSNPPASP    60
LQDNLVIALH SYEPSHDGDL GFEKGEQLRI LEQSGEWWKA QSLTTGQEGF IPFNFVAKAN   120
SLEPEPWFFK NLSRKDAERQ LLAPGNTHGS FLIRESESTA GSFSLSVRDF DQNQGEVVKH   180
YKIRNLDNGG FYISPRITFP GLHELVRHYT NASDGLCTRL SRPCQTQKPQ KPWWEDEWEV   240
PRETLKLVER LGAGQFGEVV MGYYNGHTKV AVKSLKQGSM SPDAFLAEAN LMKQLQHQRL   300
VRLYAVVTQE PIYIITEYME NGSLVDFLKT PSGIKLTINK LLDMAAQIAE GMAFIEERNY   360
IHRDLRAANI LVSDTLSCKI ADFGLARLIE DNEYTAREGA KFPIKWTAPE AINYGTFTIK   420
SDVWSFGILL TEIVTHGRIP YPGMTNPEVI QNLERGYRMV RPDNCPEELY QLMRLCWKER   480
PEDRPTFDYL RSVLEDFFTA TEGQYQPQP                                     509

SEQ ID NO: 3              moltype = AA  length = 619
FEATURE                   Location/Qualifiers
REGION                    1..619
                          note = Amino acid sequence of Z1 (mutated human Zap-70)
source                    1..619
                          mol_type = protein
                          organism = synthetic construct
SEQUENCE: 3
MPDPAAHLPF FYGSISRAEA EEHLKLAGMA DGLFLLRQCL RSLGGYVLSL VHDVRFHHFP    60
IERQLNGTYA IAGGKAHCGP AELCEFYSRD PDGLPCNLRK PCNRPSGLEP QPGVFDCLRD   120
AMVRDYVRQT WKLEGEALEQ AIISQAPQVE KLIATTAHER MPWYHSSLTR EEAERKLYSG   180
AQTDGKFLLR PRKEQGTYAL SLIYGKTVYH YLISQDKAGK YCIPEGTKFD TLWQLVEYLK   240
LKADGLIYCL KEACPNSSAS NASGAAAPTL PAHPSTLTHP QRRIDTLNSD GYTPEPARIT   300
SPDKPRPMPM DTSVYESPYS DPEELKDKKL FLKRDNLLIA DIELGCGNFG SVRQGVYRMR   360
KKQIDVAIKV LKQGTEKADT EEMMREAQIM HQLDNPYIVR LIGVCQAEAL MLVAEMAGGG   420
PLHKFLVGKR EEIPVSNVAE LLHQVSMGMK YLEEKNFVHR DLAARNVLLV NRHYAKISDF   480
GLSKALGADD SYYTARSAGK WPLKWYAPEC INFRKFSSRS DVWSYGVTMW EALSYGQKPY   540
KKMKGPEVMA FIEQGKRMEC PPECPPELYA LMSDCWIYKW EDRPDFLTVE QRMRACYYSL   600
ASKVEGPPGS TQKAEAACA                                                619

SEQ ID NO: 4              moltype = AA  length = 619
FEATURE                   Location/Qualifiers
REGION                    1..619
                          note = Amino acid sequence of Z2 (mutated human Zap-70)
source                    1..619
                          mol_type = protein
                          organism = synthetic construct
SEQUENCE: 4
MPDPAAHLPF FYGSISRAEA EEHLKLAGMA DGLFLLRQCL RSLGGYVLSL VHDVRFHHFP    60
IERQLNGTYA IAGGKAHCGP AELCEFYSRD PDGLPCNLRK PCNRPSGLEP QPGVFDCLRD   120
AMVRDYVRQT WKLEGEALEQ AIISQAPQVE KLIATTAHER MPWYHSSLTR EEAERKLYSG   180
AQTDGKFLLR PRKEQGTYAL SLIYGKTVYH YLISQDKAGK YCIPEGTKFD TLWQLVEYLK   240
```

```
LKADGLIYCL KEACPNSSAS NASGAAAPTL PAHPSTLTHP QRRIDTLNSD GYTPEPARIT  300
SPDKPRPMPM DTSVYESPYS DPEELKDKKL FLKRDNLLIA DIELGCGNFG SVRQGVYRMR  360
KKQIDVAIKV LKQGTEKADT EEMMREAQIM HQLDNPYIVR LIGVCQAEAL MLVTEMAGGG  420
PLHKFLVGKR EEIPVSNVAE LLHQVSMGMK YLEEKNFVHR DLAARNVLLV NRHYAKISDF  480
GLSKALGADD SYYTARSAGK WPLKWYAPEC INFRKFSSRS DVWSYGVTMW EALSYGQKPY  540
KKMKGPEVMA FIEQGKRMEC PPECPPELYA LMSDCWIYKW EDRPDFLTVE QRMRACYYSL  600
ASKVEGPPGS TQKAEAACA                                              619

SEQ ID NO: 5            moltype = AA   length = 619
FEATURE                 Location/Qualifiers
REGION                  1..619
                        note = Amino acid sequence of Z3 (mutated human Zap-70)
source                  1..619
                        mol_type = protein
                        organism = synthetic construct
SEQUENCE: 5
MPDPAAHLPF FYGSISRAEA EEHLKLAGMA DGLFLLRQCL RSLGGYVLSL VHDVRFHHFP  60
IERQLNGTYA IAGGKAHCGP AELCEFYSRD PDGLPCNLRK PCNRPSGLEP QPGVFDCLRD  120
AMVRDYVRQT WKLEGEALEQ AIISQAPQVE KLIATTAHER MPWYHSSLTR EEAERKLYSG  180
AQTDGKFLLR PRKEQGTYAL SLIYGKTVYH YLISQDKAGK YCIPEGTKFD TLWQLVEYLK  240
LKADGLIYCL KEACPNSSAS NASGAAAPTL PAHPSTLTHP QRRIDTLNSD GYTPEPARIT  300
SPDKPRPMPM DTSVYESPYS DPEELKDKKL FLKRDNLLIA DIELGCGNFG SVRQGVYRMR  360
KKQIDVAIKV LKQGTEKADT EEMMREAQIM HQLDNPYIVR LIGVCQAEAL MLVVEMAGGG  420
PLHKFLVGKR EEIPVSNVAE LLHQVSMGMK YLEEKNFVHR DLAARNVLLV NRHYAKISDF  480
GLSKALGADD SYYTARSAGK WPLKWYAPEC INFRKFSSRS DVWSYGVTMW EALSYGQKPY  540
KKMKGPEVMA FIEQGKRMEC PPECPPELYA LMSDCWIYKW EDRPDFLTVE QRMRACYYSL  600
ASKVEGPPGS TQKAEAACA                                              619

SEQ ID NO: 6            moltype = AA   length = 619
FEATURE                 Location/Qualifiers
REGION                  1..619
                        note = Amino acid sequence of Z8 (mutated human Zap-70)
source                  1..619
                        mol_type = protein
                        organism = synthetic construct
SEQUENCE: 6
MPDPAAHLPF FYGSISRAEA EEHLKLAGMA DGLFLLRQCL RSLGGYVLSL VHDVRFHHFP  60
IERQLNGTYA IAGGKAHCGP AELCEFYSRD PDGLPCNLRK PCNRPSGLEP QPGVFDCLRD  120
AMVRDYVRQT WKLEGEALEQ AIISQAPQVE KLIATTAHER MPWYHSSLTR EEAERKLYSG  180
AQTDGKFLLR PRKEQGTYAL SLIYGKTVYH YLISQDKAGK YCIPEGTKFD TLWQLVEYLK  240
LKADGLIYCL KEACPNSSAS NASGAAAPTL PAHPSTLTHP QRRIDTLNSD GYTPEPARIT  300
SPDKPRPMPM DTSVYESPYS DPEELKDKKL FLKRDNLLIA DIELGCGNFG SVRQGVYRMR  360
KKQIDVAIKV LKQGTEKADT EEMMREAQIM HQLDNPYIVR LIGVCQAEAL MLVVEYAGGG  420
PLHKFLVGKR EEIPVSNVAE LLHQVSMGMK YLEEKNFVHR DLAARNVLLV NRHYAKISDF  480
GLSKALGADD SYYTARSAGK WPLKWYAPEC INFRKFSSRS DVWSYGVTMW EALSYGQKPY  540
KKMKGPEVMA FIEQGKRMEC PPECPPELYA LMSDCWIYKW EDRPDFLTVE QRMRACYYSL  600
ASKVEGPPGS TQKAEAACA                                              619

SEQ ID NO: 7            moltype = AA   length = 619
FEATURE                 Location/Qualifiers
REGION                  1..619
                        note = Amino acid sequence of Z9 (mutated human Zap-70)
source                  1..619
                        mol_type = protein
                        organism = synthetic construct
SEQUENCE: 7
MPDPAAHLPF FYGSISRAEA EEHLKLAGMA DGLFLLRQCL RSLGGYVLSL VHDVRFHHFP  60
IERQLNGTYA IAGGKAHCGP AELCEFYSRD PDGLPCNLRK PCNRPSGLEP QPGVFDCLRD  120
AMVRDYVRQT WKLEGEALEQ AIISQAPQVE KLIATTAHER MPWYHSSLTR EEAERKLYSG  180
AQTDGKFLLR PRKEQGTYAL SLIYGKTVYH YLISQDKAGK YCIPEGTKFD TLWQLVEYLK  240
LKADGLIYCL KEACPNSSAS NASGAAAPTL PAHPSTLTHP QRRIDTLNSD GYTPEPARIT  300
SPDKPRPMPM DTSVYESPYS DPEELKDKKL FLKRDNLLIA DIELGCGNFG SVRQGVYRMR  360
KKQIDVAIKV LKQGTEKADT EEMMREAQIM HQLDNPYIIR LIGVCQAEAL MLVVEMAGGG  420
PLHKFLVGKR EEIPVSNVAE LLHQVSMGMK YLEEKNFVHR DLAARNVLLV NRHYAKISDF  480
GLSKALGADD SYYTARSAGK WPLKWYAPEC INFRKFSSRS DVWSYGVTMW EALSYGQKPY  540
KKMKGPEVMA FIEQGKRMEC PPECPPELYA LMSDCWIYKW EDRPDFLTVE QRMRACYYSL  600
ASKVEGPPGS TQKAEAACA                                              619

SEQ ID NO: 8            moltype = AA   length = 619
FEATURE                 Location/Qualifiers
REGION                  1..619
                        note = Amino acid sequence of Z10 (mutated human Zap-70)
source                  1..619
                        mol_type = protein
                        organism = synthetic construct
SEQUENCE: 8
MPDPAAHLPF FYGSISRAEA EEHLKLAGMA DGLFLLRQCL RSLGGYVLSL VHDVRFHHFP  60
IERQLNGTYA IAGGKAHCGP AELCEFYSRD PDGLPCNLRK PCNRPSGLEP QPGVFDCLRD  120
AMVRDYVRQT WKLEGEALEQ AIISQAPQVE KLIATTAHER MPWYHSSLTR EEAERKLYSG  180
```

-continued

```
AQTDGKFLLR PRKEQGTYAL SLIYGKTVYH YLISQDKAGK YCIPEGTKFD TLWQLVEYLK    240
LKADGLIYCL KEACPNSSAS NASGAAAPTL PAHPSTLTHP QRRIDTLNSD GYTPEPARIT    300
SPDKPRPMPM DTSVYESPYS DPEELKDKKL FLKRDNLLIA DIELGCGNFG SVRQGVYRMR    360
KKQIDVAIKV LKQGTEKADT EEMMREAQIM HQLDNPYIIR LIGVCQAEAL MLVVEYAGGG    420
PLHKFLVGKR EEIPVSNVAE LLHQVSMGMK YLEEKNFVHR DLAARNVLLV NRHYAKISDF    480
GLSKALGADD SYYTARSAGK WPLKWYAPEC INFRKFSSRS DVWSYGVTMW EALSYGQKPY    540
KKMKGPEVMA FIEQGKRMEC PPECPPELYA LMSDCWIYKW EDRPDFLTVE QRMRACYYSL    600
ASKVEGPPGS TQKAEAACA                                                 619

SEQ ID NO: 9               moltype = AA  length = 509
FEATURE                    Location/Qualifiers
REGION                     1..509
                           note = Amino acid sequence of mutated human Lck 7 (T316V)
source                     1..509
                           mol_type = protein
                           organism = synthetic construct
SEQUENCE: 9
MGCGCSSHPE DDWMENIDVC ENCHYPIVPL DGKGTLLIRN GSEVRDPLVT YEGSNPPASP     60
LQDNLVIALH SYEPSHDGDL GFEKGEQLRI LEQSGEWWKA QSLTTGQEGF IPFNFVAKAN    120
SLEPEPWFFK NLSRKDAERQ LLAPGNTHGS FLIRESESTA GSFSLSVRDF DQNQGEVVKH    180
YKIRNLDNGG FYISPRITFP GLHELVRHYT NASDGLCTRL SRPCQTQKPQ KPWWEDEWEV    240
PRETLKLVER LGAGQFGEVW MGYYNGHTKV AVKSLKQGSM SPDAFLAEAN LMKQLQHQRL    300
VRLYAVVTQE PIYIIVEYME NGSLVDFLKT PSGIKLTINK LLDMAAQIAE GMAFIEERNY    360
IHRDLRAANI LVSDTLSCKI ADFGLARLIE DNEYTAREGA KFPIKWTAPE AINYGTFTIK    420
SDVWSFGILL TEIVTHGRIP YPGMTNPEVI QNLERGYRMV RPDNCPEELY QLMRLCWKER    480
PEDRPTFDYL RSVLEDFFTA TEGQYQPQP                                     509

SEQ ID NO: 10              moltype = AA  length = 509
FEATURE                    Location/Qualifiers
REGION                     1..509
                           note = Amino acid sequence of mutated human Lck 2 (Y318L)
source                     1..509
                           mol_type = protein
                           organism = synthetic construct
SEQUENCE: 10
MGCGCSSHPE DDWMENIDVC ENCHYPIVPL DGKGTLLIRN GSEVRDPLVT YEGSNPPASP     60
LQDNLVIALH SYEPSHDGDL GFEKGEQLRI LEQSGEWWKA QSLTTGQEGF IPFNFVAKAN    120
SLEPEPWFFK NLSRKDAERQ LLAPGNTHGS FLIRESESTA GSFSLSVRDF DQNQGEVVKH    180
YKIRNLDNGG FYISPRITFP GLHELVRHYT NASDGLCTRL SRPCQTQKPQ KPWWEDEWEV    240
PRETLKLVER LGAGQFGEVW MGYYNGHTKV AVKSLKQGSM SPDAFLAEAN LMKQLQHQRL    300
VRLYAVVTQE PIYIITELME NGSLVDFLKT PSGIKLTINK LLDMAAQIAE GMAFIEERNY    360
IHRDLRAANI LVSDTLSCKI ADFGLARLIE DNEYTAREGA KFPIKWTAPE AINYGTFTIK    420
SDVWSFGILL TEIVTHGRIP YPGMTNPEVI QNLERGYRMV RPDNCPEELY QLMRLCWKER    480
PEDRPTFDYL RSVLEDFFTA TEGQYQPQP                                     509

SEQ ID NO: 11              moltype = AA  length = 509
FEATURE                    Location/Qualifiers
REGION                     1..509
                           note = Amino acid sequence of mutated human Lck 1 (S323C)
source                     1..509
                           mol_type = protein
                           organism = synthetic construct
SEQUENCE: 11
MGCGCSSHPE DDWMENIDVC ENCHYPIVPL DGKGTLLIRN GSEVRDPLVT YEGSNPPASP     60
LQDNLVIALH SYEPSHDGDL GFEKGEQLRI LEQSGEWWKA QSLTTGQEGF IPFNFVAKAN    120
SLEPEPWFFK NLSRKDAERQ LLAPGNTHGS FLIRESESTA GSFSLSVRDF DQNQGEVVKH    180
YKIRNLDNGG FYISPRITFP GLHELVRHYT NASDGLCTRL SRPCQTQKPQ KPWWEDEWEV    240
PRETLKLVER LGAGQFGEVW MGYYNGHTKV AVKSLKQGSM SPDAFLAEAN LMKQLQHQRL    300
VRLYAVVTQE PIYIITEYME NGCLVDFLKT PSGIKLTINK LLDMAAQIAE GMAFIEERNY    360
IHRDLRAANI LVSDTLSCKI ADFGLARLIE DNEYTAREGA KFPIKWTAPE AINYGTFTIK    420
SDVWSFGILL TEIVTHGRIP YPGMTNPEVI QNLERGYRMV RPDNCPEELY QLMRLCWKER    480
PEDRPTFDYL RSVLEDFFTA TEGQYQPQP                                     509

SEQ ID NO: 12              moltype =    length =
SEQUENCE: 12
000

SEQ ID NO: 13              moltype =    length =
SEQUENCE: 13
000

SEQ ID NO: 14              moltype = DNA  length = 1857
FEATURE                    Location/Qualifiers
misc_feature               1..1857
                           note = Nucleic acid sequence of Z1 (5'- 3'; mutated human
                           Zap-70)
source                     1..1857
                           mol_type = other DNA
                           organism = synthetic construct
```

```
SEQUENCE: 14
atgcctgatc ctgccgccca tctgccattc ttctacggca gcatcagcag agccgaggcc    60
gaggaacacc tgaagctggc cggaatggcc gacggcctgt tcctgctgag acagtgcctg   120
agaagcctgg gcggctacgt gctgagcctg gtgcacgatg tgcggttcca ccacttcccc   180
atcgagcggc agctgaacgg cacctacgct atcgctggcg gcaaggccca ttgtggacct   240
gccgagctgt gcgagttcta cagcagagat cccgatggcc tgccctgcaa cctgcggaag   300
ccctgcaata gacccagcgg cctggaacct cagcccggcg tgttcgactg tctgagggat   360
gccatggtgc gcgactacgt gcggcagacc tggaagctgg aaggcgaggc tctggaacag   420
gctatcatca gccaggcccc caggtggaa aagctgatcg ccacaaccgc ccacgagcgg    480
atgcccggt atcacagcag cctgaccaga gaggaagccg agcggaagct gtactctgag   540
gcccagaccg acggcaaatt cctgctgcgc cccagaaaag agcagggcac atacgccctg   600
agcctgatct acggcaagac cgtgtaccac tacctgatct cccaggacaa ggccggcaag   660
tactgcatcc ccgagggcac caagttcgac accctgtggc agctggtgga atatctgaag   720
ctgaaggccg acggactgat ctactgcctg aaagaggcct gcccaacag cagcgccagc    780
aatgctagcg gagccgccgc tcctacactg cctgcccatc ctagcaccct gacccaccc   840
cagagaagaa tcgatacct gaattccgac ggctacaccc ccgagcctgc agaatcacc    900
agccccgaca agcccagacc catgcccatg gacaccagcg tgtacgagag ccctacagc   960
gaccccgagg aactgaagga caagaagctg ttcctgaagc gggacaacct gctgattgcc  1020
gacatcgagc tgggctgcgg caactttgga tctgtgcgc agggcgtgta ccggatgcgg  1080
aagaaacaga tcgacgtggc catcaaggtg ctgaagcagg aaccgagaa ggccgatacc   1140
gaggaaatga tgcgcgaggc ccagatcatg caccagctgg acaacccta catcgtgcgc  1200
ctgatcggcg tgtgtcaggc cgaagctctg atgctcgtga ccgaaatggc tggcggcgga  1260
cccctgcaca agtttctcgt gggcaagcgg gaagagatcc ccgtgtccaa tgtggccgag  1320
ctgctgcacc aggtgtcaat gggaatgaag tacctcgagg aagaacttcg tgcaccgg    1380
gacctggccg ccagaaacgt gctgctcgtg aaccggcact acgccaagat cagcgacttt  1440
ggcctgagca aggccctggg cgccgacgac agctactaca cagccagatc cgccggaaag  1500
tggcccctga gtggtacgcc cccgagtgc atcaacttca gaaagttcag cagccgcagc  1560
gacgtgtggt cctacggcgt gacaatgtgg gaggccctga gctacggcca gaaaccctac  1620
aagaagatga agggccccga agtgatggcc ttcatcgagc agggaaagcg gatggaaatgc  1680
cccctgagt gccctcctga gctgtatgcc ctgatgagcg actgctggat ctacaagtgg  1740
gaggaccggc ccgacttcct gaccgtggaa cagagaatgc gggcctgcta ctacagcctg  1800
gcctctaagg tggaaggccc tcctggcagc acccagaaag ccgaagccgc ctgtgct     1857

SEQ ID NO: 15          moltype = DNA  length = 1857
FEATURE                Location/Qualifiers
misc_feature           1..1857
                       note = Nucleic acid sequence of Z2 (5'- 3'; mutated human
                       Zap-70)
source                 1..1857
                       mol_type = other DNA
                       organism = synthetic construct
SEQUENCE: 15
atgcctgatc ctgccgccca tctgccattc ttctacggca gcatcagcag agccgaggcc    60
gaggaacacc tgaagctggc cggaatggcc gacggcctgt tcctgctgag acagtgcctg   120
agaagcctgg gcggctacgt gctgagcctg gtgcacgatg tgcggttcca ccacttcccc   180
atcgagcggc agctgaacgg cacctacgct atcgctggcg gcaaggccca ttgtggacct   240
gccgagctgt gcgagttcta cagcagagat cccgatggcc tgccctgcaa cctgcggaag   300
ccctgcaata gacccagcgg cctggaacct cagcccggcg tgttcgactg tctgagggat   360
gccatggtgc gcgactacgt gcggcagacc tggaagctgg aaggcgaggc tctggaacag   420
gctatcatca gccaggcccc caggtggaa aagctgatcg ccacaaccgc ccacgagcgg    480
atgcccggt atcacagcag cctgaccaga gaggaagccg agcggaagct gtactctgag   540
gcccagaccg acggcaaatt cctgctgcgc cccagaaaag agcagggcac atacgccctg   600
agcctgatct acggcaagac cgtgtaccac tacctgatct cccaggacaa ggccggcaag   660
tactgcatcc ccgagggcac caagttcgac accctgtggc agctggtgga atatctgaag   720
ctgaaggccg acggactgat ctactgcctg aaagaggcct gcccaacag cagcgccagc    780
aatgctagcg gagccgccgc tcctacactg cctgcccatc ctagcaccct gacccaccc   840
cagagaagaa tcgatacct gaattccgac ggctacaccc ccgagcctgc agaatcacc    900
agccccgaca agcccagacc catgcccatg gacaccagcg tgtacgagag ccctacagc   960
gaccccgagg aactgaagga caagaagctg ttcctgaagc gggacaacct gctgattgcc  1020
gacatcgagc tgggctgcgg caactttgga tctgtgcgc agggcgtgta ccggatgcgg  1080
aagaaacaga tcgacgtggc catcaaggtg ctgaagcagg aaccgagaa ggccgatacc   1140
gaggaaatga tgcgcgaggc ccagatcatg caccagctgg acaacccta catcgtgcgc  1200
ctgatcggcg tgtgtcaggc cgaagctctg atgctcgtga ccgaaatggc tggcggcgga  1260
cccctgcaca agtttctcgt gggcaagcgg gaagagatcc ccgtgtccaa tgtggccgag  1320
ctgctgcacc aggtgtcaat gggaatgaag tacctcgagg aagaacttcg tgcaccgg    1380
gacctggccg ccagaaacgt gctgctcgtg aaccggcact acgccaagat cagcgacttt  1440
ggcctgagca aggccctggg cgccgacgac agctactaca cagccagatc cgccggaaag  1500
tggcccctga gtggtacgcc cccgagtgc atcaacttca gaaagttcag cagccgcagc  1560
gacgtgtggt cctacggcgt gacaatgtgg gaggccctga gctacggcca gaaaccctac  1620
aagaagatga agggccccga agtgatggcc ttcatcgagc agggaaagcg gatggaaatgc  1680
cccctgagt gccctcctga gctgtatgcc ctgatgagcg actgctggat ctacaagtgg  1740
gaggaccggc ccgacttcct gaccgtggaa cagagaatgc gggcctgcta ctacagcctg  1800
gcctctaagg tggaaggccc tcctggcagc acccagaaag ccgaagccgc ctgtgct     1857

SEQ ID NO: 16          moltype = DNA  length = 1857
FEATURE                Location/Qualifiers
misc_feature           1..1857
                       note = Nucleic acid sequence of Z3 (5'- 3'; mutated human
                       Zap-70)
```

| source | 1..1857 |
| --- | --- |
| | mol_type = other DNA |
| | organism = synthetic construct |

SEQUENCE: 16

```
atgcctgatc ctgccgccca tctgccattc ttctacggca gcatcagcag agccgaggcc   60
gaggaacacc tgaagctggc cggaatggcc gacggcctgt tcctgctgag acagtgcctg  120
agaagcctgg gcggctacgt gctgagcctg gtgcacgatg tgcggttcca ccacttcccc  180
atcgagcggc agctgaacgg cacctacgct atcgctggcg gcaaggccca ttgtggacct  240
gccgagctgt gcgagttcta cagcagagat cccgatggcc tgccctgcaa cctgcggaag  300
ccctgcaata gacccagcgg cctggaacct cagcccgtgc tgttcgactg tctgagggat  360
gccatggtgc gcgactacgt gcggcagacc tggaagctgg aaggcgaggc tctgaacag  420
gctatcatca gccaggcccc caggtggaaa agctgatcg ccacaaccgc ccacgagcgg  480
atgccctggt atcacagcag cctgaccaga gaggaagccg agcggaagct gtactctggc  540
gcccagaccg acggcaaatt cctgctgcgg cccagaaaag agcagggcac atacgccctg  600
agcctgatct acggcaagac cgtgtaccac tacctgatct cccaggacaa ggccggcaag  660
tactgcatcc ccgagggcac caagttcgac accctgtggc agctggtgga atatctgaag  720
ctgaaggccg acggactgat ctactgcctg aaagaggcct gccccaacag cagcgccagc  780
aatgctagcg gagccgccgc tcctacactg cctgcccatc ctagcaccct gacccacccc  840
cagagaagaa tcgatacct gaattccgac ggctacaccc ccgagcctgc agaatcacc  900
agccccgaca gcccagacc catgccatg gacaccagcg tgtacgagag ccctacagc  960
gaccccgagg aactgaagga caagaagctg ttcctgaagc gggacaacct gctgattgcc 1020
gacatcgagc tgggctgcgg caacttgga tctgtgcggc agggcgtgta ccggatgcgg 1080
aagaaacaga tcgacgtggc catcaaggtg ctgaagcagg aaccgagaa ggccgatacc 1140
gaggaaatga tgcgcgaggc ccagatcatg caccagctgg acaaccccta catcgtgcgg 1200
ctgatcggcg tgtgtcaggc cgaagctctg atgctcgtgg tcgaaatggc tggcggcgga 1260
cccctgcaca agttttctgt gggcaagcgg aagagatcc ccgtgtccaa tgtggccgag 1320
ctgctgcacc aggtgtcaat gggaatgaag tacctcgagg agaagaactt cgtgcaccgg 1380
gacctggccg ccagaaacgt gctgctcgtg aaccggcact acgccaagat cagcgacttt 1440
ggcctgagca aggccctggg cgccgacgac agctactaca cagccagatc cgccggaaag 1500
tggcccctga gtggtacgc ccccgagtgc atcaacttca gaagttcag cagccgcagc 1560
gacgtgtggt cctacggcgt gacaatgtgg gaggccctga gctacggcca gaaaccctac 1620
aagaagatga agggccccga agtgatggcc ttcatcgagc agggaaagcg gatggaatgc 1680
ccccctgagt gccctcctga gctgtatgcc ctgatgagcg actgctggat ctacaagtgg 1740
gaggaccggc cgacttcct gaccgtgaaa cagagaatgc gggcctgcta ctacagcctg 1800
gcctctaagg tggaaggccc tcctggcagc acccagaaag ccgaagccgc ctgtgct    1857
```

| SEQ ID NO: 17 | moltype = DNA   length = 1857 |
| --- | --- |
| FEATURE | Location/Qualifiers |
| misc_feature | 1..1857 |
| | note = Nucleic acid sequence of Z8 (5'- 3'; mutated human Zap-70) |
| source | 1..1857 |
| | mol_type = other DNA |
| | organism = synthetic construct |

SEQUENCE: 17

```
atgcctgatc ctgccgccca tctgccattc ttctacggca gcatcagcag agccgaggcc   60
gaggaacacc tgaagctggc cggaatggcc gacggcctgt tcctgctgag acagtgcctg  120
agaagcctgg gcggctacgt gctgagcctg gtgcacgatg tgcggttcca ccacttcccc  180
atcgagcggc agctgaacgg cacctacgct atcgctggcg gcaaggccca ttgtggacct  240
gccgagctgt gcgagttcta cagcagagat cccgatggcc tgccctgcaa cctgcggaag  300
ccctgcaata gacccagcgg cctggaacct cagcccgtgc tgttcgactg tctgagggat  360
gccatggtgc gcgactacgt gcggcagacc tggaagctgg aaggcgaggc tctgaacag  420
gctatcatca gccaggcccc caggtggaaa agctgatcg ccacaaccgc ccacgagcgg  480
atgccctggt atcacagcag cctgaccaga gaggaagccg agcggaagct gtactctggc  540
gcccagaccg acggcaaatt cctgctgcgg cccagaaaag agcagggcac atacgccctg  600
agcctgatct acggcaagac cgtgtaccac tacctgatct cccaggacaa ggccggcaag  660
tactgcatcc ccgagggcac caagttcgac accctgtggc agctggtgga atatctgaag  720
ctgaaggccg acggactgat ctactgcctg aaagaggcct gccccaacag cagcgccagc  780
aatgctagcg gagccgccgc tcctacactg cctgcccatc ctagcaccct gacccacccc  840
cagagaagaa tcgatacct gaattccgac ggctacaccc ccgagcctgc agaatcacc  900
agccccgaca gcccagacc catgccatg gacaccagcg tgtacgagag ccctacagc  960
gaccccgagg aactgaagga caagaagctg ttcctgaagc gggacaacct gctgattgcc 1020
gacatcgagc tgggctgcgg caacttgga tctgtgcggc agggcgtgta ccggatgcgg 1080
aagaaacaga tcgacgtggc catcaaggtg ctgaagcagg aaccgagaa ggccgatacc 1140
gaggaaatga tgcgcgaggc ccagatcatg caccagctgg acaaccccta catcgtgcgg 1200
ctgatcggcg tgtgtcaggc cgaagctctg atgctcgtgg tcgaatacgc tggcggcgga 1260
cccctgcaca agttttctgt gggcaagcgg aagagatcc ccgtgtccaa tgtggccgag 1320
ctgctgcacc aggtgtcaat gggaatgaag tacctcgagg agaagaactt cgtgcaccgg 1380
gacctggccg ccagaaacgt gctgctcgtg aaccggcact acgccaagat cagcgacttt 1440
ggcctgagca aggccctggg cgccgacgac agctactaca cagccagatc cgccggaaag 1500
tggcccctga gtggtacgc ccccgagtgc atcaacttca gaagttcag cagccgcagc 1560
gacgtgtggt cctacggcgt gacaatgtgg gaggccctga gctacggcca gaaaccctac 1620
aagaagatga agggccccga agtgatggcc ttcatcgagc agggaaagcg gatggaatgc 1680
ccccctgagt gccctcctga gctgtatgcc ctgatgagcg actgctggat ctacaagtgg 1740
gaggaccggc cgacttcct gaccgtgaaa cagagaatgc gggcctgcta ctacagcctg 1800
gcctctaagg tggaaggccc tcctggcagc acccagaaag ccgaagccgc ctgtgct    1857
```

| SEQ ID NO: 18 | moltype = DNA   length = 1857 |
| --- | --- |
| FEATURE | Location/Qualifiers |

| misc_feature | 1..1857 |
| | note = Nucleic acid sequence of Z9 (5'- 3'; mutated human Zap-70) |
| source | 1..1857 |
| | mol_type = other DNA |
| | organism = synthetic construct |

SEQUENCE: 18

```
atgcctgatc ctgccgccca tctgccattc ttctacggca gcatcagcag agccgaggcc    60
gaggaacacc tgaagctggc cggaatggcc gacggcctgt tcctgctgag acagtgcctg   120
agaagcctgg gcggctacgt gctgagcctg gtgcacgatg tgcggttcca ccacttcccc   180
atcgagcggc agctgaacgg cacctacgct atcgctggcg gcaaggccca ttgtggacct   240
gccgagctgt gcgagttcta cagcagagat cccgatggcc tgccctgcaa cctgcggaag   300
ccctgcaata gacccagcgg cctggaacct cagcccggcg tgttcgactg tctgagggat   360
gccatggtgc gcgactacgt gcggcagacc tggaagctga aggcgaggc tctgaacag    420
gctatcatca gccaggcccc ccaggtggaa aagctgatcg ccacaacgc ccacgagcgg   480
atgccctggt atcacagcag cctgaccaga gaggaagccg agcggaagct gtactctggc   540
gcccagaccg acggcaaatt cctgctgcgg cccagaaaag agcagggcac atacgccctg   600
agcctgatct acggcaagac cgtgtaccac tacctgatct cccaggacaa ggccggcaag   660
tactgcatcc ccgagggcac caagttcgac accctgtggc agctggtgga atatctgaag   720
ctgaaggccg acgactgat ctactgcctg aaagaggcct gcccaacag cagcgccagc   780
aatgctagcg gagccgccgc tcctacactg cctgcccatc ctagcaccct gacccacccc   840
cagagaagaa tcgataccct gaattccgac ggctacaccc cgagcctgc cagaatcacc   900
agccccgaca gcccagacc catgcccatg gacaccagcc tgtacgagag ccctacagg   960
gaccccgagg aactgaagga caagaagctg ttcctgaagc gggacaacct gctgattgcc  1020
gacatcgagc tgggctgcgg caactttgga tctgtgcgc agggcgtgta ccggatgcgg  1080
aagaaacaga tcgacgtggc catcaaggtg ctgaagcagg aaccgagaa ggccgatacc  1140
gaggaaatga tgcgcgaggc ccagatcatg caccagctgg acaacccta catcattcgg  1200
ctgatccggg tgtgtcaggc cgaagctctg atgctcgtgg tcgaaatggc tggcggcgga  1260
cccctgcaca gtttctcgt gggcaagcgg aagagatcc ccgtgtccaa tgtggccgag  1320
ctgctgcacc aggtgtcaat gggaatgaag tacctcgagg agaagaactt cgtgcaccgg  1380
gacctggccg ccagaaacgt gctgctcgtg aaccggcact acgccaagat cagcgacttt  1440
ggcctgagca aggccctggg cgccgacgac agctactaca cagccagatc cgccggaaag  1500
tggccctga agtggtacgc ccccgagtgc atcaacttca gaaagttcag cagccgcagc  1560
gacgtgtggt cctacggcgt gacaatgtgg gaggccctga gctacggcca gaaccctac  1620
aagaagatga agggccccga agtgatggcc ttcatcgagc agggaaagcg gatggaatgc  1680
cccctgagt gccctcctga gctgtatgcc ctgatgagcg actgctggat ctacaagtgg  1740
gaggaccggc ccgacttcct gaccgtggaa cagagaatgc gggcctgcta ctacagcctg  1800
gcctctaagg tggaaggccc tcctggcagc acccagaaag ccgaagccgc ctgtgct    1857
```

SEQ ID NO: 19         moltype = DNA   length = 1857
FEATURE                Location/Qualifiers
| misc_feature | 1..1857 |
| | note = Nucleic acid sequence of Z10 (5'- 3'; mutated human Zap-70) |
| source | 1..1857 |
| | mol_type = other DNA |
| | organism = synthetic construct |

SEQUENCE: 19

```
atgcctgatc ctgccgccca tctgccattc ttctacggca gcatcagcag agccgaggcc    60
gaggaacacc tgaagctggc cggaatggcc gacggcctgt tcctgctgag acagtgcctg   120
agaagcctgg gcggctacgt gctgagcctg gtgcacgatg tgcggttcca ccacttcccc   180
atcgagcggc agctgaacgg cacctacgct atcgctggcg gcaaggccca ttgtggacct   240
gccgagctgt gcgagttcta cagcagagat cccgatggcc tgccctgcaa cctgcggaag   300
ccctgcaata gacccagcgg cctggaacct cagcccggcg tgttcgactg tctgagggat   360
gccatggtgc gcgactacgt gcggcagacc tggaagctga aggcgaggc tctgaacag    420
gctatcatca gccaggcccc ccaggtggaa aagctgatcg ccacaacgc ccacgagcgg   480
atgccctggt atcacagcag cctgaccaga gaggaagccg agcggaagct gtactctggc   540
gcccagaccg acggcaaatt cctgctgcgg cccagaaaag agcagggcac atacgccctg   600
agcctgatct acggcaagac cgtgtaccac tacctgatct cccaggacaa ggccggcaag   660
tactgcatcc ccgagggcac caagttcgac accctgtggc agctggtgga atatctgaag   720
ctgaaggccg acgactgat ctactgcctg aaagaggcct gcccaacag cagcgccagc   780
aatgctagcg gagccgccgc tcctacactg cctgcccatc ctagcaccct gacccacccc   840
cagagaagaa tcgataccct gaattccgac ggctacaccc cgagcctgc cagaatcacc   900
agccccgaca gcccagacc catgcccatg gacaccagcc tgtacgagag ccctacagg   960
gaccccgagg aactgaagga caagaagctg ttcctgaagc gggacaacct gctgattgcc  1020
gacatcgagc tgggctgcgg caactttgga tctgtgcgc agggcgtgta ccggatgcgg  1080
aagaaacaga tcgacgtggc catcaaggtg ctgaagcagg aaccgagaa ggccgatacc  1140
gaggaaatga tgcgcgaggc ccagatcatg caccagctgg acaacccta catcattcgg  1200
ctgatccggg tgtgtcaggc cgaagctctg atgctcgtgg tcgaatacgc tggcggcgga  1260
cccctgcaca gtttctcgt gggcaagcgg aagagatcc ccgtgtccaa tgtggccgag  1320
ctgctgcacc aggtgtcaat gggaatgaag tacctcgagg agaagaactt cgtgcaccgg  1380
gacctggccg ccagaaacgt gctgctcgtg aaccggcact acgccaagat cagcgacttt  1440
ggcctgagca aggccctggg cgccgacgac agctactaca cagccagatc cgccggaaag  1500
tggccctga agtggtacgc ccccgagtgc atcaacttca gaaagttcag cagccgcagc  1560
gacgtgtggt cctacggcgt gacaatgtgg gaggccctga gctacggcca gaaccctac  1620
aagaagatga agggccccga agtgatggcc ttcatcgagc agggaaagcg gatggaatgc  1680
cccctgagt gccctcctga gctgtatgcc ctgatgagcg actgctggat ctacaagtgg  1740
gaggaccggc ccgacttcct gaccgtggaa cagagaatgc gggcctgcta ctacagcctg  1800
gcctctaagg tggaaggccc tcctggcagc acccagaaag ccgaagccgc ctgtgct    1857
```

```
SEQ ID NO: 20          moltype = AA  length = 509
FEATURE                Location/Qualifiers
REGION                 1..509
                       note = Amino acid sequence of mutated human Lck 4 (S323C +
                       Y318L)
source                 1..509
                       mol_type = protein
                       organism = synthetic construct
SEQUENCE: 20
MGCGCSSHPE DDWMENIDVC ENCHYPIVPL DGKGTLLIRN GSEVRDPLVT YEGSNPPASP   60
LQDNLVIALH SYEPSHDGDL GFEKGEQLRI LEQSGEWWKA QSLTTGQEGF IPFNFVAKAN  120
SLEPEPWFFK NLSRKDAERQ LLAPGNTHGS FLIRESESTA GSFSLSVRDF DQNQGEVVKH  180
YKIRNLDNGG FYISPRITFP GLHELVRHYT NASDGLCTRL SRPCQTQKPQ KPWWEDEWEV  240
PRETLKLVER LGAGQFGEVW MGYYNGHTKV AVKSLKQGSM SPDAFLAEAN LMKQLQHQRL  300
VRLYAVVTQE PIYIITELME NGCLVDFLKT PSGIKLTINK LLDMAAQIAE GMAFIEERNY  360
IHRDLRAANI LVSDTLSCKI ADFGLARLIE DNEYTAREGA KFPIKWTAPE AINYGTFTIK  420
SDVWSFGILL TEIVTHGRIP YPGMTNPEVI QNLERGYRMV RPDNCPEELY QLMRLCWKER  480
PEDRPTFDYL RSVLEDFFTA TEGQYQPQP                                    509
```